(12) United States Patent
Abata et al.

(10) Patent No.: US 8,399,536 B2
(45) Date of Patent: *Mar. 19, 2013

(54) IRRADIATED POLYOLEFIN COMPOSITION COMPRISING A NON-PHENOLIC STABILIZER

(75) Inventors: Jeffrey D. Abata, Liberty Township, OH (US); Ronald F. Becker, Newark, DE (US); Vu A. Dang, Bear, DE (US); Anthony J. De Nicola, Jr., Newark, DE (US); Theodore Dziemianowicz, Bryn Mawr, PA (US)

(73) Assignee: Basell Poliolefine Italia, s.r.l., Milan (IT)

( * ) Notice: Subject to any disclaimer, the term of this patent is extended or adjusted under 35 U.S.C. 154(b) by 343 days.

This patent is subject to a terminal disclaimer.

(21) Appl. No.: 12/452,185

(22) PCT Filed: Jun. 27, 2008

(86) PCT No.: PCT/EP2008/058241
§ 371 (c)(1),
(2), (4) Date: Dec. 18, 2009

(87) PCT Pub. No.: WO2009/003930
PCT Pub. Date: Jan. 8, 2009

(65) Prior Publication Data
US 2010/0113637 A1   May 6, 2010

Related U.S. Application Data

(60) Provisional application No. 60/937,649, filed on Jun. 29, 2007.

(51) Int. Cl.
*C08F 2/46* (2006.01)
*C08J 3/28* (2006.01)

(52) U.S. Cl. ........ 522/161; 522/150; 522/157; 522/158; 522/160; 522/912; 522/74; 522/75; 522/76

(58) Field of Classification Search .................. 522/150, 522/157, 158, 161, 912, 71, 74, 78, 75, 76
See application file for complete search history.

(56) References Cited

U.S. PATENT DOCUMENTS

| | | | |
|---|---|---|---|
| 3,004,896 A | 10/1961 | Heller et al. | |
| 3,055,896 A | 9/1962 | Boyle et al. | |
| 3,072,585 A | 1/1963 | Milionis et al. | |
| 3,074,910 A | 1/1963 | Dickinson | |
| 3,189,615 A | 6/1965 | Heller et al. | |
| 3,218,332 A | 11/1965 | Heller et al. | |
| 3,230,194 A | 1/1966 | Boyle | |
| 3,843,371 A | 10/1974 | Piller et al. | |
| 4,127,586 A | 11/1978 | Rody et al. | |
| 4,226,763 A | 10/1980 | Dexter et al. | |
| 4,268,450 A | 5/1981 | Frankel et al. | |
| 4,275,004 A | 6/1981 | Winter et al. | |
| 4,278,589 A | 7/1981 | Dexter et al. | |
| 4,298,718 A | 11/1981 | Mayr et al. | |
| 4,315,848 A | 2/1982 | Dexter et al. | |
| 4,325,863 A | 4/1982 | Hinsken et al. | |
| 4,338,244 A | 7/1982 | Hinsken et al. | |
| 4,347,180 A | 8/1982 | Winter et al. | |
| 4,383,863 A | 5/1983 | Dexter et al. | |
| 4,495,338 A | 1/1985 | Mayr et al. | |
| 4,619,956 A | 10/1986 | Susi | |
| 4,675,352 A | 6/1987 | Winter et al. | |
| 4,681,905 A | 7/1987 | Kubota et al. | |
| 4,740,542 A | 4/1988 | Susi | |
| 4,797,438 A | 1/1989 | Kletecka et al. | |
| 4,853,471 A | 8/1989 | Rody et al. | |
| 4,971,937 A | 11/1990 | Albitzzati et al. | |
| 4,978,648 A | 12/1990 | Barbe et al. | |
| 5,047,446 A | 9/1991 | DeNicola, Jr. | |
| 5,068,213 A | 11/1991 | Albizzati et al. | |
| 5,095,153 A | 3/1992 | Agnes et al. | |
| 5,096,489 A | 3/1992 | Laver | |
| 5,096,950 A * | 3/1992 | Galbo et al. | ............ 524/99 |
| 5,106,891 A | 4/1992 | Valet | |
| 5,122,593 A | 6/1992 | Jennings et al. | |
| 5,175,312 A | 12/1992 | Dubs et al. | |
| 5,216,052 A | 6/1993 | Nesvadba | |
| 5,221,651 A | 6/1993 | Sachetti et al. | |
| 5,252,643 A | 10/1993 | Nesvadba | |
| 5,278,314 A | 1/1994 | Winter et al. | |
| 5,280,124 A | 1/1994 | Winter et al. | |
| 5,298,067 A | 3/1994 | Valet et al. | |
| 5,300,414 A | 4/1994 | Leppard et al. | |
| 5,319,091 A | 6/1994 | DesLauriers et al. | |
| 5,354,794 A | 10/1994 | Stevenson et al. | |
| 5,356,966 A | 10/1994 | Nesvadba | |
| 5,367,008 A | 11/1994 | Nesvadba | |
| 5,369,159 A | 11/1994 | Nesvadba | |
| 5,410,071 A | 4/1995 | DesLauriers et al. | |
| 5,414,027 A | 5/1995 | DeNicola, Jr. et al. | |
| 5,428,162 A | 6/1995 | Nesvadba | |
| 5,428,177 A | 6/1995 | Nesvadba | |
| 5,436,349 A | 7/1995 | Winter et al. | |
| 5,461,151 A | 10/1995 | Waterman | |
| 5,476,937 A | 12/1995 | Stevenson et al. | |
| 5,488,117 A | 1/1996 | Nesvadba | |
| 5,489,503 A | 2/1996 | Toan | |
| 5,508,319 A | 4/1996 | DeNicola, Jr. et al. | |
| 5,516,914 A | 5/1996 | Winter et al. | |
| 5,516,920 A | 5/1996 | Nesvadba et al. | |
| 5,543,518 A | 8/1996 | Stevenson et al. | |
| 5,554,760 A | 9/1996 | Winter et al. | |

(Continued)

FOREIGN PATENT DOCUMENTS

EP   0634441   1/1995
WO   WO 03/004964   1/2003

*Primary Examiner* — Sanza McClendon

(57) ABSTRACT

The present subject matter relates generally to polymer compositions, and more particularly to irradiated polymer compositions comprising at least one non-phenolic stabilizer. The present polymer compositions comprise an unexpected balance of properties after being subjected to irradiation treatments, including an unexpected combination of a lower melt flow rate ratio ($MFR_r$) and high melt tension after being irradiated, while minimizing negative yellowing effects.

20 Claims, No Drawings

U.S. PATENT DOCUMENTS

| Patent No. | | Date | Inventor |
|---|---|---|---|
| 5,556,973 | A | 9/1996 | Stevenson et al. |
| 5,559,167 | A | 9/1996 | Manhood |
| 5,563,242 | A | 10/1996 | Winter et al. |
| 5,574,166 | A | 11/1996 | Winter et al. |
| 5,578,541 | A | 11/1996 | Sacchetti et al. |
| 5,591,785 | A | 1/1997 | Scheve et al. |
| 5,596,033 | A * | 1/1997 | Horsey et al. ................ 524/100 |
| 5,597,854 | A | 1/1997 | Birbaum et al. |
| 5,607,987 | A | 3/1997 | Winter et al. |
| 5,614,572 | A | 3/1997 | Nesvadba et al. |
| 5,681,955 | A | 10/1997 | Stevenson |
| 5,726,261 | A | 3/1998 | Sachetti et al. |
| 5,726,309 | A | 3/1998 | Stevenson et al. |
| 5,731,362 | A | 3/1998 | Scheve et al. |
| 5,883,165 | A | 3/1999 | Kröhnke |
| 5,942,626 | A | 8/1999 | Winter et al. |
| 5,959,008 | A | 9/1999 | Birbaum et al. |
| 5,977,219 | A | 11/1999 | Ravichandran et al. |
| 5,998,116 | A | 12/1999 | Hayoz et al. |
| 6,013,704 | A | 1/2000 | Hayoz et al. |
| 6,060,543 | A | 5/2000 | Bolle et al. |
| 6,087,919 | A | 7/2000 | Golinelli |
| 6,242,598 | B1 | 6/2001 | Stevenson et al. |
| 6,255,483 | B1 | 7/2001 | Fletcher et al. |
| 6,392,041 | B1 | 5/2002 | Galbo et al. |
| 6,664,317 | B2 | 12/2003 | King, III |
| 6,872,764 | B2 | 3/2005 | King, III |
| 7,342,078 | B2 | 3/2008 | Schottek |
| 7,935,740 | B2 * | 5/2011 | Dang et al. ................ 522/157 |

* cited by examiner

IRRADIATED POLYOLEFIN COMPOSITION COMPRISING A NON-PHENOLIC STABILIZER

The present subject matter relates generally to polymer compositions, and more particularly to irradiated polymer compositions comprising at least one non-phenolic stabilizer. The present polymer compositions comprise an unexpected balance of properties after being subjected to at least one irradiation treatment, including an unexpected combination of a lower melt flow rate ratio ($MFR_r$) and high melt tension, while minimizing negative yellowing effects.

Polymer compositions have been making significant inroads into technologies where there is a desire to produce particular articles that can be pre-sterilized, used for the intended purpose, and then properly disposed of. The shift from glass, metal, and cloth to polymer compositions, in particular polyolefin-based compositions, has historically been driven by lower cost, greater convenience, and growing concerns with respect to handling and disposing of hazardous waste.

Accordingly, polymers, and in particular polyolefin polymers, are useful in a variety of applications where sterilization with irradiation is employed. See for example U.S. Pat. Nos. 4,797,438, 5,122,593 and 5,559,167, which are all incorporated herein by reference in their entirety. Polyolefin medical packaging, hospital garments, surgery utensils, blow-molded I.V. bottles, hypodermic syringes, needle shields, laboratory ware, such as trays, funnels, Petri dishes and filters, and hygiene related articles may all require pre-sterilization with irradiation. Generally, sterilization with irradiation can be achieved by exposing a polymer composition to a total of about 0.5 to about 20 Megarad of irradiation. Traditionally, irradiation processes are done in air, and are performed over a period of time, for example, from about 1 minute to about 24 hours in multiple low dosages to give a higher total irradiation exposure, or the polymer composition can be irradiated in a single, higher dosage.

However, although traditional irradiation processes performed in air are successful in eliminating unwanted organisms and bacteria, the processes can place significant stress on the properties of the polymer material. Physical properties, including strength, toughness, brittleness, and aesthetic properties, such as color, taste, and odor of the polymer material are usually negatively affected to some degree from traditional irradiation processes, due to the processes producing a high level of radicals within the composition. The formation of radicals within polymer materials treated by irradiation processes can be attributed to carbon-hydrogen or carbon-carbon cleavage of polymer chains within the material. Additionally, in presence of active oxygen, the radicals can convert to a variety of oxidation by-products, which are generally unstable. Accordingly, the oxidation by-products undergo further degradation within the polymer composition, which self-propagates additional degradation within the polymer.

In particular, polyolefin homopolymers and copolymers, such as polypropylene homopolymers and copolymers, degrade rapidly when exposed to high ionizing radiation in presence of oxygen, and develop objectionable yellowing and suffer a severe loss of physical integrity. As a general corollary, the higher the total radiation exposure is for the polymer material, with respect to the longer the storage time is for the material at room temperature following the radiation exposure, the worse the degradation affects are for the material. In order to combat the negative effects associated with degradative radicals produced by traditional irradiation processes, stabilizers are often used. However, phenolic-based stabilizers, which are typically used to impart melt stability to polymer resins during processing, are not suitable for high energy irradiation exposure, since phenolic-based stabilizers have a tendency to severely discolor any article produced from the polymer resin following irradiation treatment. Accordingly, non-phenolic stabilizers have been produced to try and prevent, or limit the damaging affects of high radiation dosages from traditional irradiation processes.

In particular, in U.S. Pat. Nos. 6,664,317 and 6,872,764, both of which are incorporated herein by reference in their entirety, articles formed from polymer compositions comprising non-phenolic stabilizers were irradiated in air by traditional irradiation processes to sterilize the material. These stabilizers can be somewhat effective in sterilization processes by limiting the severity of degradative affects from radicals formed from traditional irradiation treatments in air, thereby limiting the overall degradation affects on the polymer material incurred from the sterilization process.

In addition to sterilization processes, high energy ionizing radiation treatments can also be used as a chemical processing method for polymeric materials, including polyolefin materials. In this case, the ionizing radiation from traditional irradiation processes is not necessarily used to sterilize the polymer material, but instead to actually modify the chemical composition of the material. However, free radicals formed from the irradiation treatment can negatively affect the chemical modification of the polymer material. Accordingly, degradative affects associated with radical formation from traditional irradiation processes can be minimized by irradiating the polymer material in a reduced oxygen environment, instead of air, and by using phenolic stabilizers, which are usually added before and/or after the irradiation process. Additionally, phenolic stabilizers can help minimize degradative coloring of the composition during subsequent melt extrusion operations.

For example, in previous attempts to chemically modify polymer compositions by radiation exposure, the compositions were treated with phenolic stabilizers and were either exposed to multiple lower level irradiation dosages, or a single, higher level irradiation dose in a reduced oxygen environment. In particular, in U.S. Pat. Nos. 4,916,198, 5,047,446, 5,414,027, 5,508,319, 5,591,785, and 5,731,362, all of which are incorporated herein by reference in their entirety, propylene polymer compositions comprising phenolic stabilizers were irradiated at high irradiation dosages in a pre-determined, reduced oxygen environment. However, even though these compositions tend to exhibit better properties than compositions chemically modified by traditional irradiation processes in air, the compositions of the aforementioned patents can still tend to exhibit less than desirable physical properties after chemical modification by irradiation, including highly increased melt flow rates, lower melt tensions, and increased yellowing.

For these reasons, there still remains a need in the art for polymer compositions comprising a more preferable balance of physical properties, including compositions that comprise a lower melt flow rate ratio, a high melt tension, and minimal yellowing after being chemically modified by exposure to at least one irradiation treatment.

Accordingly, it has been unexpectedly found that by irradiating polymer compositions comprising at least one non-phenolic stabilizer in a reduce oxygen environment, the resultant chemically modified polymer compositions comprise a better balance of physical properties, including lower melt flow rate ratios, higher melt tensions, and lower yellowing.

The present subject matter relates generally to polymer compositions, and more particularly to irradiated polymer compositions comprising at least one non-phenolic stabilizer.

In this regard, a preferred embodiment of the present subject matter relates to an irradiated polymer composition comprising:

(A) at least one polyolefin resin, wherein the polyolefin resin is selected from the group consisting of:
  a crystalline propylene homopolymer comprising an isotactic index greater than 80%;
  a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;
  a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;
  an olefin polymer composition comprising:
    about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%; about 3 parts to about 25 parts by weight of a copolymer of ethylene and propylene, or ethylene and a $C_4$-$C_{10}$ α-olefin, wherein the copolymer is insoluble in xylene at ambient temperature; and
    about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
    wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;
  a thermoplastic olefin comprising:
    about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
    about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
    about 3% to about 40% by weight of a copolymer of ethylene and propylene or a copolymer of ethylene and an α-olefin, wherein the copolymer is insoluble in xylene at ambient temperature;
  an ethylene homopolymer;
  a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;
  a random terpolymer of ethylene and two $C_{3-10}$ α-olefins, wherein the random terpolymer comprises a maximum polymerized α-olefin content of about 20% by weight;
  a butene-1 homopolymer;
  a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and
  mixtures and combinations thereof; and
(B) at least one non-phenolic stabilizer,
wherein the irradiated polymer composition is produced by a process comprising:
  mixing the polyolefin resin with the non-phenolic stabilizer to form an intermediate polyolefin resin;
  irradiating the intermediate polyolefin resin with about 2 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;
  maintaining the intermediate irradiated polyolefin resin in the reduced oxygen environment for a period of time sufficient for a significant amount of long chain branches to form within the intermediate irradiated polyolefin resin; and
  treating the intermediate irradiated polyolefin resin while the intermediate irradiated polyolefin resin is in the reduced oxygen environment to substantially deactivate all free radicals present in the intermediate irradiated polyolefin resin.

Additionally, another preferred embodiment of the present subject matter relates to a process for producing an irradiated polymer composition, wherein the irradiated polymer composition comprises:

(A) at least one polyolefin resin, wherein the polyolefin resin is selected from the group consisting of:
  a crystalline propylene homopolymer comprising an isotactic index greater than 80%;

a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;

a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;

an olefin polymer composition comprising:

about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;

about 3 parts to about 25 parts by weight of a copolymer of ethylene and propylene, or ethylene and a $C_4$-$C_{10}$ α-olefin, wherein the copolymer is insoluble in xylene at ambient temperature; and about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

a thermoplastic olefin comprising:

about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;

about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and about 3% to about 40% by weight of a copolymer of ethylene and propylene or a copolymer of ethylene and an α-olefin, wherein the copolymer is insoluble in xylene at ambient temperature;

an ethylene homopolymer;

a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;

a random terpolymer of ethylene and two $C_{3-10}$ α-olefins, wherein the random terpolymer comprises a maximum polymerized α-olefin content of about 20% by weight;

a butene-1 homopolymer;

a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and mixtures and combinations thereof; and (B) at least one non-phenolic stabilizer, the process comprising:

mixing the polyolefin resin with the non-phenolic stabilizer to form an intermediate polyolefin resin;

irradiating the intermediate polyolefin resin with about 2 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;

maintaining the intermediate irradiated polyolefin resin in the reduced oxygen environment for a period of time sufficient for a significant amount of long chain branches to form within the intermediate irradiated polyolefin resin; and treating the intermediate irradiated polyolefin resin while the intermediate irradiated polyolefin resin is in the reduced oxygen environment to substantially deactivate all free radicals present in the intermediate irradiated polyolefin resin.

Moreover, another preferred embodiment of the present subject matter relates to a foamed article comprising an irradiated polymer composition, wherein the irradiated polymer composition comprises:

(A) at least one polyolefin resin, wherein the polyolefin resin is selected from the group consisting of:

a crystalline propylene homopolymer comprising an isotactic index greater than 80%;

a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;

a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;

an olefin polymer composition comprising:
about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
about 3 parts to about 25 parts by weight of a copolymer of ethylene and propylene, or ethylene and a $C_4$-$C_{10}$ α-olefin, wherein the copolymer is insoluble in xylene at ambient temperature; and
about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

a thermoplastic olefin comprising:
about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
about 3% to about 40% by weight of a copolymer of ethylene and propylene or a copolymer of ethylene and an α-olefin, wherein the copolymer is insoluble in xylene at ambient temperature;

an ethylene homopolymer;
a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;

a random terpolymer of ethylene and two $C_{3-10}$ α-olefins, wherein the random terpolymer comprises a maximum polymerized α-olefin content of about 20% by weight;
a butene-1 homopolymer;
a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and mixtures and combinations thereof; and (B) at least one non-phenolic stabilizer,
wherein the irradiated polymer composition is produced by a process comprising:
mixing the polyolefin resin with the non-phenolic stabilizer to form an intermediate polyolefin resin;
irradiating the intermediate polyolefin resin with about 2 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;
maintaining the intermediate irradiated polyolefin resin in the reduced oxygen environment for a period of time sufficient for a significant amount of long chain branches to form within the intermediate irradiated polyolefin resin; and
treating the intermediate irradiated polyolefin resin while the intermediate irradiated polyolefin resin is in the reduced oxygen environment to substantially deactivate all free radicals present in the intermediate irradiated polyolefin resin.

DEFINITIONS

As used herein, the term $\lfloor MFR_i \rfloor$ refers to the melt flow rate of an intermediate polyolefin resin of the present subject matter, wherein the melt flow rate is determined by ASTM D1238.

As used herein, the term $\lfloor MFR_f \rfloor$ refers to the final melt flow rate of an irradiated polymer composition of the present subject matter determined by ASTM D1238, wherein the irradiated polymer composition is derived from the corresponding intermediate polyolefin resin of the present subject matter.

As used herein, the term $\lfloor MFR_r \rfloor$ refers to a melt flow rate ratio, wherein the melt flow rate ratio is defined as being equal to the final melt flow rate of an irradiated polymer composition of the present subject matter ($MFR_f$) with respect to the melt flow rate of the corresponding intermediate polyolefin resin of the present subject matter ($MFR_i$).

Polymer Compositions

A preferred aspect of the subject matter expressed herein relates to various irradiated polymer compositions comprising a non-phenolic stabilizer. In this regard, the present subject matter preferably relates to an irradiated polymer composition comprising:
(A) at least one polyolefin resin, wherein the polyolefin resin is selected from the group consisting of:
(a) a crystalline propylene homopolymer comprising an isotactic index greater than 80%;
(b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;

(c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;

an olefin polymer composition comprising:
  (i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
  (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
  (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

(e) a thermoplastic olefin comprising:
  (i) about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature;

(f) an ethylene homopolymer;
(g) a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;
(h) a random terpolymer of ethylene and two $C_{3-10}$ α-olefins, wherein the random terpolymer comprises a maximum polymerized α-olefin content of about 20% by weight;
(i) a butene-1 homopolymer;
(j) a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and
(k) mixtures and combinations thereof; and
(B) at least one non-phenolic stabilizer,
wherein the irradiated polymer composition is produced by a process comprising:
  mixing the polyolefin resin with the non-phenolic stabilizer to form an intermediate polyolefin resin;
  irradiating the intermediate polyolefin resin with about 2 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;
  maintaining the intermediate irradiated polyolefin resin in the reduced oxygen environment for a period of time sufficient for a significant amount of long chain branches to form within the intermediate irradiated polyolefin resin; and
  treating the intermediate irradiated polyolefin resin while the intermediate irradiated polyolefin resin is in the reduced oxygen environment to substantially deactivate all free radicals present in the intermediate irradiated polyolefin resin.

Irradiated polymer compositions, including pre-sterilized and chemically modified compositions, are used in a wide variety of applications in many industries, including the medical and chemical fields. However, as previously mentioned, past irradiated polymer compositions comprising phenolic and non-phenolic stabilizers produced by traditional irradiation processes, wherein the compositions are irradiated in air, regardless of whether the traditional irradiation process is done to sterilize or chemically modify the compositions, suffered from reduced physical properties, including highly increased melt flow rates, lower melt tensions, and increased yellowing. Accordingly, the present compositions are advantageous over previous compositions in that they comprise a better balance of physical properties, including lower melt flow rate ratios, higher melt tensions, and decreased yellowing despite being subjected to a high total irradiation dosage, which can range from a total radiation exposure of about 2 Megarad to about 20 Megarad.

Additionally, as discussed previously, in an attempt to produce irradiated polymer compositions comprising a better balance of physical properties, polymer compositions comprising phenolic stabilizers were irradiated in reduced oxygen environments to control the amount of free-radicals formed within the polymer compositions. However, although these compositions demonstrated better physical properties over previous polymer compositions comprising phenolic and non-phenolic stabilizers irradiated in air by traditional irradiation processes, they still exhibited a less desirable balance of physical properties. It is believed that the cause for the less desirable balance of physical properties experienced by the polymer compositions comprising a phenolic stabilizer irradiated in a reduced oxygen environment is due to the phenolic stabilizer interfering with radical reformation reactions, which is believed to lead to free-end long chain polymer branches being produced during and after irradiation exposure. As such, the previous resultant irradiated polymer compositions have less desirable properties.

In contrast, the present subject matter relates to irradiated polymer compositions comprising a non-phenolic stabilizer, with the polymer composition being irradiated in a reduced oxygen environment. The present irradiated polymer compositions are unique in that they unexpectedly comprise a desirable balance of physical properties, including lower melt flow rate ratios, higher melt tension, and reduced yellowing.

Furthermore, the remarkable balance of properties of the irradiated polymer compositions of the present subject matter solve long felt difficulties in formulating chemically modified polymer compositions comprising a desirable balance of physical properties. Since the present irradiated polymer compositions comprise a more desirable balance of properties, including lower melt flow rate ratios, higher melt tensions, and reduced yellowing over previously known irradiated polymer compositions in the art, the present irradiated polymer compositions provide unexpected advantages over prior pre-sterilized irradiated polymer compositions and prior chemically modified irradiated polymer compositions.

For example, the present irradiated polymer compositions unexpectedly comprise lower melt flow rate ratios and higher melt tensions, which produce more durable, less brittle products, which can be produced in an economical processing manner. Additionally, the enhanced physical properties unexpectedly provide the present irradiated polymer compositions with reduced yellowing compared to previously known irradiated polymer compositions.

Accordingly, in an embodiment of the present subject matter, the irradiated polymer compositions can comprise a final melt flow rate ($MFR_f$) ranging from about 0.001 to about 200 g/10 min. at 230° C. and a load of 2.16 kg, more preferably from about 0.01 to about 100 g/10 min. at 230° C. and a load of 2.16 kg, and most preferably from about 0.1 to about 50 g/10 min. at 230° C. and a load of 2.16 kg.

In another embodiment of the present subject matter, the irradiated polymer compositions can comprise a melt tension ranging from about 9 to about 100 cN, more preferably from about 12 to about 80 cN, and most preferably from about 14 to about 70 cN, when the $MFR_f$ of the irradiated polymer composition ranges from about 0.001 to about 10 g/10 min. at 230° C. and a load of 2.16 kg. In yet another embodiment of the present subject matter, the irradiated polymer compositions can comprise a melt tension ranging from about 0.1 to about 15 cN, more preferably from about 0.5 to about 12 cN, and most preferably from about 1 to about 10 cN, when the $MFR_f$ of the irradiated polymer composition ranges from about 10 to about 200 g/10 min. at 230° C. and a load of 2.16 kg.

Additionally, in an embodiment of the present subject matter, the irradiated polymer compositions can comprise a melt flow rate ratio ($MFR_r$), of less than 45, more preferably less then 40, and most preferably less then 35, wherein as defined previously ($MFR_r$)=($MFR_f$)/($MFR_i$).

Moreover, the irradiated polymer compositions of the present subject matter can comprise a yellowing of less than 16, preferably less then 14, and most preferably less than 12.

Accordingly, the present irradiated polymer compositions comprising a non-phenolic stabilizer, which are irradiated in a reduced oxygen environment are novel over previously known irradiated polymer compositions, and satisfy a long felt need in the art by providing irradiated polymer compositions with a more desirable balance of properties, including lower melt flow rate ratios, higher melt tensions, and reduced yellowing.

Polyolefin Resin

In the present subject matter, various types of polymer resins can be used in the irradiated polymer compositions, including various homopolymers, copolymers, terpolymers, and blends thereof.

In a particularly preferred aspect of the present subject matter, the polymer resin comprises at least one polyolefin resin. Additionally, in another particularly preferred aspect of the present subject matter, the polyolefin resin is selected from the group consisting of:
  (a) a crystalline propylene homopolymer comprising an isotactic index greater than 80%;
  (b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;
  (c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;
  an olefin polymer composition comprising:
    (i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
    (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
    (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

(e) a thermoplastic olefin comprising:
  (i) about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature;

(f) an ethylene homopolymer;

(g) a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;

(h) a random terpolymer of ethylene and two $C_{3-10}$ α-olefins, wherein the random terpolymer comprises a maximum polymerized α-olefin content of about 20% by weight;

(i) a butene-1 homopolymer;

(j) a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and (k) mixtures and combinations thereof.

In yet another preferred embodiment, the polyolefin resin is selected from the group consisting of:

(a) a crystalline propylene homopolymer comprising an isotactic index greater than 80%;

(b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;

(c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;

(d) an olefin polymer composition comprising:
  (i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
  (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
  (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

(e) a thermoplastic olefin comprising:
  (i) about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature;

(f) an ethylene homopolymer;

(g) a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight; and (h) a random terpolymer of ethylene and two $C_{3-10}$ α-olefins, wherein the random terpolymer comprises a maximum polymerized α-olefin content of about 20% by weight.

Moreover, in another preferred aspect of the present subject mater, the polyolefin resin is selected from the group consisting of:
(a) a crystalline propylene homopolymer comprising an isotactic index greater than 80%;
(b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;
(c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight; and
(d) an olefin polymer composition comprising:
(i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
(ii) about 3 parts to about 25 parts by weight of a copolymer of ethylene and propylene, or ethylene and a $C_4$-$C_{10}$ α-olefin, wherein the copolymer is insoluble in xylene at ambient temperature; and
(iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages.

The polyolefin resins of the present subject matter can additionally comprises a variety of properties. In particular, in several preferred embodiments, the crystalline propylene homopolymer can comprise an isotactic index ranging from about 90% to about 99.5%, the crystalline random copolymer of propylene and an olefin can comprise a maximum polymerized ethylene content of about 6% to about 8%, the crystalline random copolymer can comprise a maximum polymerized $C_4$-$C_{10}$ α-olefin content of about 16%, the crystalline random copolymer can comprise an isotactic index greater than 60%, more preferably the crystalline random copolymer can comprise an isotactic index of at least 70%, and the crystalline random terpolymer can comprises a maximum polymerized $C_4$-$C_{10}$ α-olefin content of about 16%.

Additionally, in several preferred embodiments, the crystalline random terpolymer can comprise a maximum polymerized ethylene content of about 6% to about 8%, the crystalline random terpolymer can comprise an isotactic index greater than 85%, the olefin polymer composition can comprise about 15 parts to about 55 parts of the crystalline propylene homopolymer, the olefin polymer composition can comprise a crystalline propylene homopolymer comprising an isotactic index of about 90% to about 99.5%, the olefin polymer composition can comprise a crystalline copolymer comprising a propylene content of about 90% to about 99% by weight, the olefin polymer composition can comprise about 5 parts to about 20 parts of the copolymer of ethylene and propylene, the olefin polymer composition can comprise about 15 parts to about 65 parts of the elastomeric copolymer, and the elastomeric copolymer of the olefin polymer composition can comprise about 10% to about 60% of ethylene.

Moreover, in several preferred embodiments, the elastomeric copolymer of the olefin polymer composition can comprise about 12% to about 55% of ethylene, the olefin polymer composition can comprise a weight ratio of components (ii)/(iii) of 0.1 to 0.3, the thermoplastic olefin can comprise about 20% to about 50% of a propylene homopolymer, the thermoplastic olefin can comprise a propylene homopolymer comprising an isotactic index of about 90% to about 99.5%, the thermoplastic olefin can comprise about 30% to about 50% of an amorphous copolymer selected from the group consisting of (a) ethylene and propylene, (b) ethylene, propylene, and an $C_4$-$C_8$ α-olefin, and (c) ethylene and a α-olefin, and the thermoplastic olefin can comprise about 10% to about 20% of a copolymer of ethylene and propylene, or a copolymer of ethylene and an α-olefin wherein the copolymer is insoluble in xylene at ambient temperature.

Additionally, the polyolefin resin of the present subject matter can be homogenized.

The polyolefin resins of the present subject matter can be prepared by a variety of catalyst systems, with the catalyst systems comprising at least one metallocene catalyst, Ziegler-Natta catalyst, or combination thereof.

Accordingly, in an embodiment of the present subject matter, the polyolefin resins can be prepared by at least one catalyst system, wherein the catalyst system comprises at least one metallocene compound of formula (A):

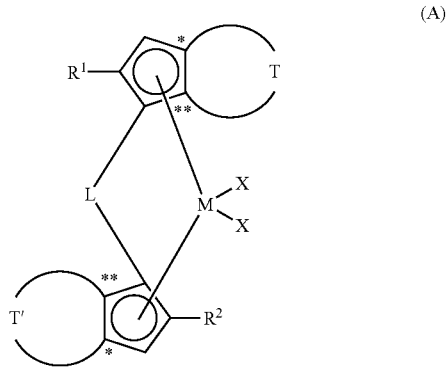

wherein
M is zirconium, hafnium, or titanium;
X are identical or different, and are each independently of one another, hydrogen, halogen, R, OR, $OSO_2CF_3$, OCOR, SR, NR$_2$, or PR$_2$, with two X radicals optionally being joined to form a cyclic system, the cyclic system optionally comprising at least one heteroatom;

R are identical or different, and are each independently of one another, a linear or branched C$_1$-C$_{20}$-alkyl, C$_3$-C$_{20}$-cycloalkyl optionally comprising at least one C$_1$-C$_{10}$-alkyl radical as a substituent, C$_6$-C$_{20}$-aryl, C$_7$-C$_{20}$-alkylaryl, or C$_7$-C$_{20}$-arylalkyl, wherein R optionally comprises at least one heteroatom from groups 13 □17 of the Periodic Table of Elements and R optionally comprises at least one unsaturated bond;

L is a divalent bridging group selected from the group consisting of a C$_1$-C$_{20}$-alkylidene, a C$_3$-C$_{20}$-cycloalkylidene, a C$_6$-C$_{20}$-arylidene, a C$_7$-C$_{20}$-alkylarylidene and a C$_7$-C$_{20}$-arylalkylidene radical, wherein L optionally comprises at least one heteroatom from groups 13-17 of the Periodic Table of Elements, or is a silylidene group comprising up to 5 silicon atoms;

R$^1$ and R$^2$ are identical or different, and are each independently of one another, hydrogen, or a linear or branched C$_1$-C$_{20}$-alkyl or C$_3$-C$_{20}$-cycloalkyl wherein the C$_1$-C$_{20}$-alkyl or C$_3$-C$_{20}$-cycloalkyl optionally comprise at least one C$_1$-C$_{10}$-alkyl radical as a substituent, C$_6$-C$_{20}$-aryl, C$_7$-C$_{40}$-alkylaryl, or C$_7$-C$_{40}$-arylalkyl, and wherein R$^1$ and R$^2$ optionally comprise at least one heteroatom from groups 13-17 of the Periodic Table of Elements, and R$^1$ and R$^2$ optionally comprise at least one unsaturated bond;

T and T' are identical or different, and are each independently of one another, divalent groups of formula (B), (C), (D), (E), (F) or (G):

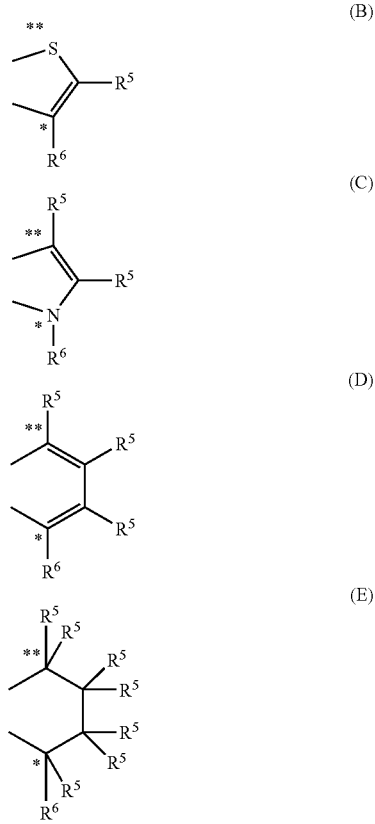

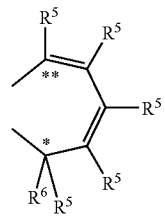

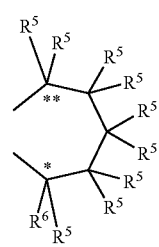

wherein
the atoms denoted by symbols * and ** are in each case joined to the atoms denoted by the same symbol in the metallocene compound of formula (A), and
R$^5$ and R$^6$ are identical or different, and are each independently of one another, hydrogen, or a linear or branched C$_1$-C$_{20}$-alkyl or C$_3$-C$_{20}$-cycloalkyl wherein the C$_1$-C$_{20}$-alkyl or C$_3$-C$_{20}$-cycloalkyl optionally comprise at least one C$_1$-C$_{10}$-alkyl radical as a substituent, C$_6$-C$_{20}$-aryl, C$_7$-C$_{40}$-alkylaryl, or C$_7$-C$_{40}$-arylalkyl, and wherein R$^1$ and R$^2$ optionally comprise at least one heteroatom from groups 13-17 of the Periodic Table of Elements, and R$^5$ and R$^6$ optionally comprise at least one unsaturated bond, or two radicals selected from two R$^5$ radicals, or a R$^5$ and R$^6$ radical, are joined to form a saturated or unsaturated C$_3$-C$_{20}$ cyclic system, the C$_3$-C$_{20}$ cyclic system optionally comprising at least one heteroatom.

In another embodiment of the present subject matter, the polyolefin resins can be prepared by at least one catalyst system, wherein the catalyst system comprises at least one metallocene compound of formula (A), and wherein M of the metallocene compound is zirconium. Additionally, in another embodiment, the polyolefin resins of the present subject matter can be prepared by at least one catalyst system, wherein the catalyst system comprises at least one metallocene compound of formula (A), wherein R are identical or different, and are each independently of one another, a C$_1$-C$_{10}$-alkyl, including but not limited to methyl, ethyl, n-propyl, isopropyl, n-butyl, isobutyl, sec-butyl, tert-butyl, n-pentyl, n-hexyl, n-heptyl, or n-octyl, or R are, identical or different and are each independently of one another, a C$_3$-C$_{20}$-cycloalkyl, including but not limited to cyclopentyl or cyclohexyl. Moreover, in another preferred embodiment, the polyolefin resins of the present subject matter can be prepared by at least one catalyst system comprising at least one metallocene compound of formula (A), wherein two X radicals are joined to form a C$_4$-C$_{40}$-dienyl ligand, in particular a 1,3-dienyl ligand, or □OR$^{33}$O, □wherein R$^{33}$ is a divalent group selected from the group consisting of a C$_1$-C$_{40}$-alkylidene, a C$_6$-C$_{40}$-arylidene, a C$_7$-C$_{40}$-alkylarylidene and a C$_7$-C$_{40}$-arylalkylidene. In another embodiment, X are identical or different, and are each independently of one another, halogen, including chlorine, or methyl, □R, □OR, or two X radicals are joined to form □OR$^{33}$O□.

In yet another embodiment, the polyolefin resins of the present subject matter can be prepared by at least one catalyst system comprising at least one metallocene compound of formula (A), wherein L is a radical selected from the group consisting of silylidenes, including □SiMe$_2$, □SiPh$_2$, □SiPhMe,□ and □SiMe (SiMe$_3$),□ and alkylidenes □CH$_2$,□ (CH$_2$)$_2$,□ (CH$_2$)$_3$,□ and □C(CH$_3$)$_2$□.

Additionally, in another embodiment, the polyolefin resins of the present subject matter can be prepared by at least one catalyst system comprising at least one metallocene compound of formula (A), wherein $R^1$ and $R^2$ are identical or different, and are each independently of one another, a linear or branched $C_1$-$C_{10}$-alkyl, in particular a linear $C_1$-$C_4$-alkyl group, including, but not limited to, methyl, ethyl, n-propyl, or n-butyl, or a branched $C_3$- or $C_4$-alkyl group, including, but not limited to, isopropyl or tert-butyl. In another embodiment, the polyolefin resins of the present subject matter can be prepared by at least one catalyst system comprising at least one metallocene compound of formula (A), wherein $R^1$ and $R^2$ are both methyl, ethyl or isopropyl. Yet in another embodiment, $R^1$ is a linear or branched $C_1$-$C_{10}$-alkyl group, which is unbranched in the α-position, including, but not limited to, a linear $C_1$-$C_4$-alkyl group, and $R^2$ is a $C_3$-$C_{10}$-alkyl group which is branched in the α position. Non-limiting examples of the linear $C_1$-$C_4$-alkyl group include methyl, ethyl, n-propyl, and n-butyl, and non-limiting examples of the $C_3$-$C_{10}$-alkyl group include branched $C_3$- or $C_4$-alkyl groups, including isopropyl or tert-butyl groups.

Moreover, in another embodiment, the polyolefin resins of the present subject matter can be prepared by at least one catalyst system comprising at least one metallocene compound of formula (A), wherein $R^5$ are identical or different, and are each independently of one another, hydrogen or a linear or branched $C_1$-$C_{10}$-alkyl group, including, but not limited to, a $C_1$-$C_4$-alkyl group, or a $C_3$-$C_{10}$-cycloalkyl group, including, but not limited to, a $C_5$-$C_6$-cycloalkyl, a $C_6$-$C_{18}$-aryl, a $C_7$-$C_{24}$-alkylaryl, or two adjacent $R^5$ radicals are optionally joined to form a 5-7-membered cyclic system. Non-limiting examples of the $C_1$-$C_4$-alkyl group include, but are not limited to, methyl, ethyl, n-propyl, i-propyl, and n-butyl. Non-limiting examples of the $C_3$-$C_{10}$-cycloalkyl group, include, but not limited to, $C_5$-$C_6$-cycloalkyl, including, but not limited to, cyclopentyl and cyclohexyl. Non-limiting examples of the $C_6$-$C_{18}$-aryl, include, but are not limited to, phenyl or naphthyl, and non-limiting examples of the $C_7$-$C_{24}$-alkylaryl include, but are not limited to, methylphenyl, ethylphenyl, n-propylphenyl, propylphenyl, t-butylphenyl, dimethylphenyl, diethylphenyl, diisopropylphenyl, ditertbutylphenyl, trimethylphenyl, methyl-t-butylphenyl, methylnaphthyl, and dimethylnaphthyl.

Furthermore, in another embodiment, the polyolefin resins of the present subject matter can be prepared by at least one catalyst system comprising at least one metallocene compound of formula (A), wherein $R^6$ together with an adjacent $R^5$ radical form a cyclic system. Non-limiting examples of the cyclic system formed from joining the $R^6$ and adjacent $R^5$ radical include unsaturated 6-membered ring systems, or $R^6$ can be an aryl group of formula (H):

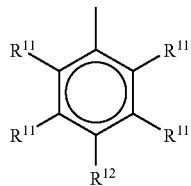

(H)

wherein
$R^{11}$ are identical or different, and are each independently of one another, hydrogen, or a linear or branched $C_1$-$C_{20}$-alkyl or $C_3$-$C_{20}$-cycloalkyl wherein the $C_1$-$C_{20}$-alkyl or $C_3$-$C_{20}$-cycloalkyl optionally comprise at least one $C_1$-$C_{10}$-alkyl radical as a substituent, $C_6$-$C_{20}$-aryl, $C_7$-$C_{40}$-alkylaryl, or $C_7$-$C_{40}$-arylalkyl, and wherein $R^{11}$ optionally comprises at least one heteroatom from groups 13-17 of the Periodic Table of Elements, and $R^{11}$ optionally comprises at least one unsaturated bond, or two $R^{11}$ radicals are optionally joined to form a saturated or unsaturated $C_3$-$C_{20}$ cyclic system, the $C_3$-$C_{20}$ cyclic system optionally comprising at least one heteroatom;

$R^{12}$ is hydrogen, halogen, or a linear or branched $C_1$-$C_{20}$-alkyl or $C_3$-$C_{20}$-cycloalkyl, wherein the $C_1$-$C_{20}$-alkyl or $C_3$-$C_{20}$-cycloalkyl optionally comprise at least one $C_1$-$C_{10}$-alkyl radical as a substituent, $C_6$-$C_{20}$-aryl, $C_7$-$C_{40}$-alkylaryl, or $C_7$-$C_{40}$-arylalkyl, and wherein $R^{12}$ optionally comprises at least one heteroatom from groups 13-17 of the Periodic Table of Elements, and $R^{12}$ optionally comprises at least one unsaturated bond.

In a preferred embodiment, $R^{11}$ can be hydrogen, and $R^{12}$ can be a □C($R^{13}$)$_3$ branched alkyl, wherein
$R^{13}$ are identical or different, and are each independently of one another, a linear or branched $C_1$-$C_6$-alkyl, or two or three $R^{13}$ radicals are joined to form one or more cyclic systems.

Yet even further, in another embodiment, the polyolefin resins of the present subject matter can be prepared by at least one catalyst system comprising at least one metallocene compound of formula (A), wherein T and T□ are substituted by at least one $R^6$ radical of formula (H), which is discussed above. In a preferred embodiment, both T and T□ can be substituted by at least one $R^6$ radical of formula (H). In yet another embodiment, at least one of T and T□ is of formula (D), and is substituted by at least one $R^6$ radical of formula (H), with the other T or T□ having either formula (B) or (D), and is substituted by at least one $R^6$ radical of formula (H). In particular, such metallocene compounds can have formula (J):

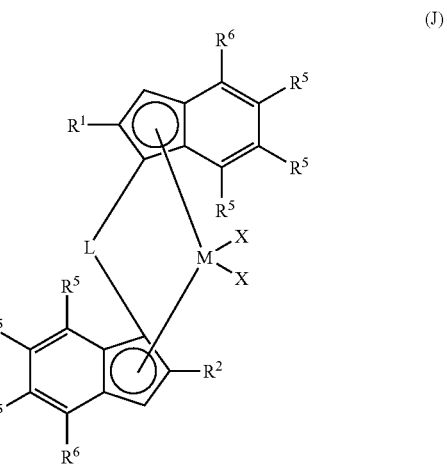

(J)

Additionally, particularly useful exemplary metallocene compounds, and processes for preparing them, for the present subject matter are described in WO 01/48034 and WO 03/045964, both of which are incorporated herein by reference in their entirety.

The metallocene compounds of formula (A) of the present subject matter are preferably used in the rac or pseudo-rac form, in which the terminology pseudo-rac form refers to complexes comprising two T and T□ groups in a rac arrangement relative to one another when all other substituents of the complex are disregarded.

Moreover, it is further contemplated by the present subject matter to prepare the polyolefin resins of the present subject matter by using a catalyst system comprising mixtures of various metallocene compounds.

Non-limiting examples of particularly useful metallocene compounds for use in a catalyst system for preparing the polyolefin resins of the present subject matter include:
dimethylsilanediylbis(indenyl)zirconium dichloride,
dimethylsilanediylbis(tetrahydroindenyl)zirconium dichloride,
ethylenebis(indenyl)zirconium dichloride,
ethylenebis(tetrahydroindenyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(2-ethylindenyl)zirconium dichloride,
dimethylsilanediylbis(2-methyl-4,5-benzindenyl)zirconium dichloride,
dimethylsilanediylbis(2-ethyl-4,5-benzindenyl)zirconium dichloride,
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)-indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-(p-trifluoromethylphenyl)indenyl)zirconium dichloride,
dimethylsilanediylbis(2-methyl-4-(3,5□-dimethylphenyl)indenyl)zirconium dichloride,
dimethylsilanediylbis(2-methyl-4-(4□-tert-butylphenyl)indenyl)zirconium dichloride,
diethylsilanediylbis(2-methyl-4-(4□-tert-butylphenyl)indenyl)zirconium dichloride,
dimethylsilanediylbis(2-ethyl-4-(4□-tert-butylphenyl)indenyl)zirconium dichloride,
dimethylsilanediylbis(2-propyl-4-(4□-tert-butylphenyl)indenyl)zirconium dichloride,
dimethylsilanediylbis(2-isopropyl-4-(4□-tert-butylphenyl)indenyl)zirconium dichloride,
dimethylsilanediylbis(2-n-butyl-4-(4□-tert-butylphenyl)indenyl)zirconium dichloride,
dimethylsilanediylbis(2-hexyl-4-(4□-tert-butylphenyl)indenyl)zirconium dichloride,
dimethylsilanediyl(2-isopropyl-4-phenylindenyl)(2-methyl-4-phenylindenyl)zirconium dichloride,
dimethylsilanediyl(2-isopropyl-4-(1-naphthyl)indenyl)(2-methyl-4-(1-naphthyl)indenyl)zirconium dichloride,
dimethylsilanediyl(2-isopropyl-4-(4□-tert-butylphenyl)indenyl)(2-methyl-4-(4□-tert-butylphenyl)indenyl)zirconium dichloride,
dimethylsilanediyl(2-isopropyl-4-(4□-tert-butylphenyl)indenyl)(2-ethyl-4-(4□-tert-butylphenyl)indenyl)zirconium dichloride,
dimethylsilanediyl(2-isopropyl-4-(4□-tert-butylphenyl)indenyl)(2-methyl-4-(3,□5-□bis-tert-butylphenyl)indenyl)zirconium dichloride,
dimethylsilanediyl(2-isopropyl-4-(4□-tert-butylphenyl)indenyl)(2-methyl-4-(1□-naphthyl)indenyl)zirconium dichloride,
ethylene(2-isopropyl-4-(4□-tert-butylphenyl)indenyl)(2-methyl-4-(4□-tert-butylphenyl)indenyl)zirconium dichloride,
dimethylsilanediyl(2-methyl-4-(4□-tert-butylphenyl)indenyl)-2-isopropyl 4-(1-naphtyl)indenyl)zirconium dichloride,
dimethylsilanediyl(2-methyl-4-phenyl)-1-indenyl)(2-isopropyl-4-(4'-tert-butylphenyl)-1-indenyl)zirconium dichloride,
dimethylsilanediyl(2-isopropyl-4-(4□tert-butylphenyl)indenyl)(2,6-dimethyl-4-(4□-tert-butylphenyl)indenyl)zirconium dichloride,
dimethylsilanediyl(2-isopropyl-4-(4□tert-butylphenyl)indenyl)(2,7-dimethyl-4-(4□-tert-butylphenyl)indenyl)zirconium dichloride,
dimethylsilanediyl(2-isopropyl-4-(4□tert-butylphenyl)indenyl)(2,5,6,7-tetramethyl-4-(4□-tert-butylphenyl)indenyl)zirconium dichloride,
dimethylsilanediyl(2-isopropyl-4-phenylindenyl)(6-methyl-4-phenyl-1,2,3,5-tetrahydro-s-indacen-7-yl)zirconium dichloride,
dimethylsilanediyl(2-isopropyl-4-phenylindenyl)(6-methyl-4-(4□-tert-butylphenyl)-1,2,3,5-tetrahydro-s-indacen-7-yl)zirconium dichloride,
dimethylsilanediyl(2-isopropyl-4-(4□tert-butylphenyl)indenyl)(6-methyl-4-phenyl-1,2,3,5-tetrahydro-s-indacen-7-yl)zirconium dichloride,
dimethylsilanediyl(2-isopropyl-4-(4□tert-butylphenyl)indenyl)(6-methyl-4-(4□-tert-butylphenyl)-1,2,3,5-tetrahydro-s-indacen-7-yl)zirconium dichloride,
dimethylsilanediyl(2-isopropyl-4-(4□-tert-butylphenyl)indenyl)(2-methyl-4,5-benzoindenyl)-zirconium dichloride,
dimethylsilanediyl(2-methyl-4-(4□-tert-butylphenyl)indenyl)(2-isopropyl-4-phenylindenyl)zirconium dichloride,
dimethylsilanediyl(2-ethyl-4-(4□-tert-butylphenyl)indenyl)(2-isopropyl-4-phenyl)indenyl)zirconium dichloride,
dimethylsilandiylbis-6-(3-methylcyclopentadienyl-[1,2-b]-thiophene)dimethyl,
dimethylsilandiylbis-6-(4-methylcyclopentadienyl-[1,2-b]-thiophene)zirconium dichloride,
dimethylsilandiylbis-6-(4-isopropylcyclopentadienyl-[1,2-b]-thiophene)zirconium dichloride,
dimethylsilandiylbis-6-(4-ter-butylcyclopentadienyl-[1,2-b]-thiophene)zirconium dichloride,
dimethylsilandiylbis-6-(3-isopropylcyclopentadienyl-[1,2-b]-thiophene)zirconium dichloride, dimethylsilandiylbis-6-(3-phenylcyclopentadienyl-[1,2-b]-thiophene)zirconium dichloride,
dimethylsilandiylbis-6-(2,5-dimethyl-3-phenylcyclopentadienyl-[1,2-b]-thiophene)zirconium di-methyl,
dimethylsilandiylbis-6-[2,5-dimethyl-3-(2-methylphenyl)cyclopentadienyl-[1,2-b]-thiophene]zirconium dichloride,
dimethylsilandiylbis-6-[2,5-dimethyl-3-(2,4,6-trimethylphenyl)cyclopentadienyl-[1,2-b]-thiophene]zirconium dichloride,
dimethylsilandiylbis-6-[2,5-dimethyl-3-mesitylenecyclopentadienyl-[1,2-b]-thiophene]zirconium dichloride,
dimethylsilandiylbis-6-(2,4,5-trimethyl-3-phenylcyclopentadienyl-[1,2-b]-thiophene)zirconium dichloride,
dimethylsilandiylbis-6-(2,5-diethyl-3-phenylcyclopentadienyl-[1,2-b]-thiophene)zirconium dichloride,
dimethylsilandiylbis-6-(2,5-diisopropyl-3-phenylcyclopentadienyl-[1,2-b]-thiophene)zirconium dichloride,
dimethylsilandiylbis-6-(2,5-diter-butyl-3-phenylcyclopentadienyl-[1,2-b]-thiophene)zirconium dichloride,
dimethylsilandiylbis-6-(2,5-ditrimethylsilyl-3-phenylcyclopentadienyl-[1,2-b]-thiophene)zirconium dichloride,
dimethylsilandiylbis-6-(2-methyl-5-isopropyl-3-phenylcyclopentadienyl-[1,2-b]-thiophene)zirconium dichloride,
dimethylsilandiylbis-6-(2-methyl-5-isopropyl-3-(4☐-tert.-butylphenyl)cyclopentadienyl-[1,2-b]-thiophene)zirconium dichloride,
dimethylsilandiyl-6-(2-methyl-5-isopropyl-3-phenylcyclopentadienyl-[1,2-b]-thiophene)-6-(2,5-dimethyl-3-phenylcyclopentadienyl-[1,2-b]-thiophene)zirconium dichloride,
dimethylsilandiyl-6-(2-methyl-5-isopropyl-3-(4☐-tert.-butylphenyl)cyclopentadienyl-[1,2-b]-thiophene)-6-(2,5-dimethyl-3-(4☐-tert.-butylphenyl)cyclopentadienyl-[1,2-b]-thiophene)zirconium dichloride,
dimethylsilandiyl-6-(2-methyl-5-isopropyl-3-phenylcyclopentadienyl-[1,2-b]-thiophene)-6-(2,5-dimethyl-3-(4☐-tert.-butylphenyl)cyclopentadienyl-[1,2-b]-thiophene)zirconium dichloride,
dimethylsilandiyl-6-(2-methyl-5-isopropyl-3-(4☐-tert.-butylphenyl)cyclopentadienyl-[1,2-b]-thiophene)-6-(2,5-dimethyl-3-phenylcyclopentadienyl-[1,2-b]-thiophene)zirconium dichloride,
dimethylsilandiyl-6-(2,5-dimethyl-3-phenylcyclopentadienyl-[1,2-b]-thiophene)(2-methyl-4-phenylindenyl)zirconium dichloride,
dimethylsilandiyl-6-(2,5-dimethyl-3-phenylcyclopentadienyl-[1,2-b]-thiophene)(2-isopropyl-4-phenylindenyl)zirconium dichloride,
dimethylsilandiyl-6-(2,5-dimethyl-3-phenylcyclopentadienyl-[1,2-b]-thiophene)(2-isopropyl-4-(1-naphthyl)indenyl)zirconium dichloride,
dimethylsilandiyl-6-(2,5-dimethyl-3-phenylcyclopentadienyl-[1,2-b]-thiophene)(2-isopropyl-4-(4☐-tert.-butylphenyl)indenyl)zirconium dichloride,
dimethylsilandiyl-6-(2,5-dimethyl-3-phenylcyclopentadienyl-[1,2-b]-thiophene)(2-isopropyl-4-(3,☐5-☐dimethylphenyl)indenyl)zirconium dichloride,
dimethylsilandiyl-6-(2,5-dimethyl-3-phenylcyclopentadienyl-[1,2-b]-thiophene)(2-isopropyl-4-(2☐,5-☐dimethylphenyl)indenyl)zirconium dichloride,
dimethylsilandiyl-6-(2-methyl-5-isopropyl-3-phenylcyclopentadienyl-[1,2-b]-thiophene)(2-methyl-4-phenylindenyl)zirconium dichloride,
dimethylsilandiyl-6-(2-methyl-5-isopropyl-3-phenylcyclopentadienyl-[1,2-b]-thiophene)(2-ethyl-4-phenylindenyl)zirconium dichloride,
dimethylsilandiyl-6-(2-methyl-5-isopropyl-3-(3,☐5-☐dimethylphenyl)cyclopentadienyl-[1,2-b]-thiophene)(2-methyl-4-phenylindenyl)zirconium dichloride,
dimethylsilandiyl-6-(2-methyl-5-isopropyl-3-(2,☐5-☐dimethylphenyl)cyclopentadienyl-[1,2-b]-thiophene)(2-methyl-4-phenylindenyl)zirconium dichloride,
dimethylsilandiyl-6-(2-methyl-5-isopropyl-3-(4☐-tert.-butylphenyl)cyclopentadienyl-[1,2-b]-thiophene)(2-methyl-4-phenylindenyl)zirconium dichloride,
dimethylsilandiyl-6-(2-methyl-5-isopropyl-3-(3☐,5-☐dimethylphenyl)cyclopentadienyl-[1,2-b]-thiophene)(2-methyl-4-(4☐-methylphenyl)indenyl)zirconium dichloride,
dimethylzirconium, monochloromono(alkylaryloxy)zirconium compounds,
di(alkylaryloxy)zirconium compounds, and mixtures thereof.

Additionally, in another embodiment, the polyolefin resins of the present subject matter can be prepared by at least one catalyst system comprising at least one Ziegler/Natta catalyst, wherein the catalyst system can comprise at least one product of a reaction between an aluminum alkyl and a solid catalyst component, the solid catalyst component can comprise at least one transition metal on a magnesium halide support, with the magnesium halide support preferably being a $MgCl_2$ support. In particular, the catalyst system comprising the Ziegler/Natta catalyst, can be obtained by using a product of a reaction between:

(i) a solid catalyst component comprising (a) at least one titanium compound, the titanium compound preferably not comprising any bonds, (b) at least one internal electron donor compound, and (c) a magnesium halide support;

(ii) an alkyl-aluminum compound; and (iii) optionally, at least one external electron donor compound.

In an embodiment of the present subject matter, at least one external electron donor compound is used in the catalyst system to obtain at least one polyolefin resin optionally comprising an isotacticity (mm) greater than about 80. However, if at least one internal electron donor compound is used, the stereospecificity of the Ziegler/Natta catalyst can be sufficiently high, thus making the use of an external electron donor compound unnecessary.

Non-limiting examples of useful internal electron donor compounds are described in Patent EP-A-361,493, which is incorporated herein by reference in its entirety.

In another preferred embodiment, the magnesium halide support, including magnesium chloride supports, can preferably be in an active form, and are well known to those skilled in the art. For example, U.S. Pat. Nos. 4,298,718 and 4,495,338, both of which are incorporated herein by reference in their entirety, describe the use of magnesium halide supports in Ziegler-Natta catalysis.

In yet another embodiment, the titanium compound can be selected from at least one titanium halide, titanium halogeno-alcoholate, or combination thereof. Non-limiting examples of useful titanium compounds include $TiCl_4$, $TiCl_3$, at least one $Ti(OR^{35})_m \square X^1_n \square$titanium halogeno-alcoholate, wherein $R^{35}$ are identical or different, and are each independently of one another, a $C_1$-$C_{12}$ hydrocarbon, or $COR^{36}$;

$X^1$ is halogen;

(m-☐n)☐is a valency of titanium; and $R^{36}$ is a linear or branched $C_1$-$C_{20}$-alkyl, $C_3$-$C_{20}$-cycloalkyl optionally comprising at least one $C_1$-$C_{10}$-alkyl radical as a substituent, $C_6$-$C_{20}$-aryl, $C_7$-$C_{20}$-alkylaryl, or $C_7$-$C_{20}$-arylalkyl.

In another embodiment, the solid catalyst component comprising the titanium compound, the internal electron donor compound, and the magnesium halide support can be in a spherical particle form, and optionally comprises an average diameter of between about 10 and about 150 μm. Non-limiting methods for preparing useful, spherical solid catalyst components are described in Patents EP-A-395,083, EP-A-553,805 and EP-A-553,806, all of which are incorporated herein by reference in their entirety.

Moreover, in another embodiment, the internal electron donor compound can include, but is not limited to, at least one ether, ester, amine, ketone, and 1,3-diether. In a preferred embodiment, the ester comprises at least one ester of a polycarboxylic acid. Non-limiting examples of useful internal electron donor compounds are described in Patents EP-A-361,493, EP-A-361,494, EP-A-362,705, and EP-A-451,645, all of which are incorporated herein by reference in their entirety.

Yet in another embodiment, the alkyl-aluminum compound can be selected from the aluminium trialkyls, including, but not limited to, Al-triethyl, Al-triisobutyl, Al-tri-n-butyl, Al-tri-n-hexyl, Al-tri-n-octyl, and mixtures thereof. Additionally, in a preferred embodiment, mixtures of Al-trialkyls and Al-alkyl halides, Al-alkyl hydrides, or Al-alkyl sesquichlorides, including $AlEt_2Cl$ and $Al_2Et_3Cl_3$, can be used.

In another embodiment, the external electron donor compound can be the same or different from the internal electron donor compound, and in another embodiment, if the internal electron donor compound comprises at least one ester of a polycarboxylic acid, including a phthalate, the external donor is preferably selected from at least one $R^{37}R^{38}Si(OR^{39})_2$ silicon compound, wherein $R^{37}$, $R^{38}$, and $R^{39}$ are identical or different, and are each independently of one another, a $C_1$-$C_{20}$-alkyl, a $C_3$-$C_{20}$-cycloalkyl optionally comprising at least one $C_1$-$C_{10}$-alkyl radical as a substituent, a $C_6$-$C_{20}$-aryl, a $C_7$-$C_{20}$-alkylaryl, or a $C_7$-$C_{20}$-arylalkyl.

Non-limiting examples of useful silicon compounds include methyl-cyclohexyl-dimethoxy-silane, diphenyl-dimethoxy-silane, methyl-t-butyl-dimethoxy-silane, dicyclopentyl-dimethoxy-silane, and combinations thereof.

Additionally, the catalyst system for preparing the polyolefin resins of the present subject matter can comprise at least one co-catalyst. In a preferred embodiment, the co-catalyst can be selected from an alumoxane compound, organo-aluminum compound, a $D^+E^-$ co-catalyst compound, wherein $D^+$ is a Brønsted acid, able to donate a proton and to react irreversibly with X of the metallocene compound of formula (A); and $E^-$ is a compatible anion, which is able to stabilize the active catalytic species originating from the reaction of the metallocene compound of formula (A) and the $D^+E^-$ co-catalyst compound, and wherein $E^-$ is sufficiently labile to be able to be removed by an olefinic monomer; and mixtures thereof. Suitable useful co-catalysts are well known to those skilled in the art.

Non-Phenolic Stabilizer

In the present subject matter, various types of non-phenolic stabilizers can be used in the irradiated polymer compositions. The non-phenolic stabilizers can be added to the polyolefin resins of the present subject matter prior to being irradiated, after being irradiated, or both. Preferably, at least one non-phenolic stabilizer of the present subject matter is added to at least one polyolefin resin of the present subject matter before the polyolefin resin is irradiated.

Non-phenolic stabilizers, as defined throughout this disclosure, are defined as chemical compositions comprising either no phenolic entities, or a minimum amount of phenolic entities in which the minimum amount of phenolic entities do not negatively materially affect the properties of the present irradiated polymer compositions, the processes for producing the present irradiated polymer compositions, and articles produced from the present irradiated polymer compositions.

In an embodiment of the present subject matter, the non-phenolic stabilizer comprises at least one:

(a) hindered amine;
(b) compound selected from the group consisting of:
  i.) a hydroxylamine;
  ii.) a nitrone;
  iii.) an amine oxide;
  iv.) benzofuranone; and
  v.) mixtures thereof;
(c) organic phosphite;
(d) phosphonite; and
(e) mixtures thereof.

In a preferred embodiment, the non-phenolic stabilizer of the present subject matter comprises at least one hindered amine, wherein the hindered amine comprises at least one group of formula (I):

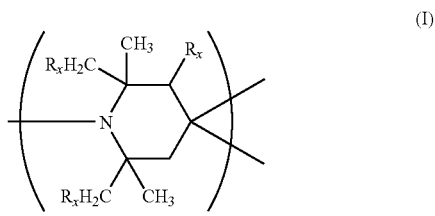

wherein $R_x$ are each, independently of each other, hydrogen, a $C_1$-$C_{10}$ alkyl, a $C_2$-$C_{10}$ alkenyl, a $C_3$-$C_{10}$ aryl, and an arylalkyl comprising from 1 to 10 carbon atoms in the alkyl part and from 3 to 10 carbon atoms in the aryl part.

In this regard, in another preferred embodiment, the non-phenolic stabilizer comprises at least one hindered amine, wherein the hindered amine is selected from the group consisting of:

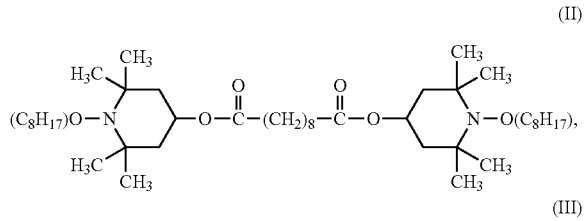

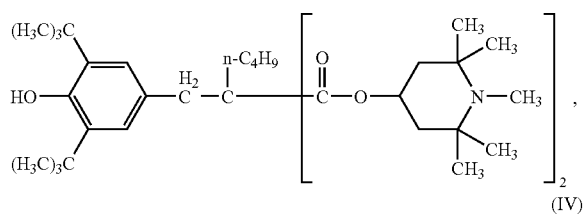

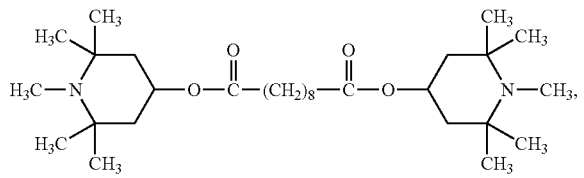

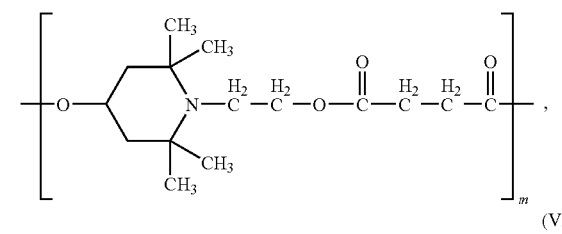
(V)
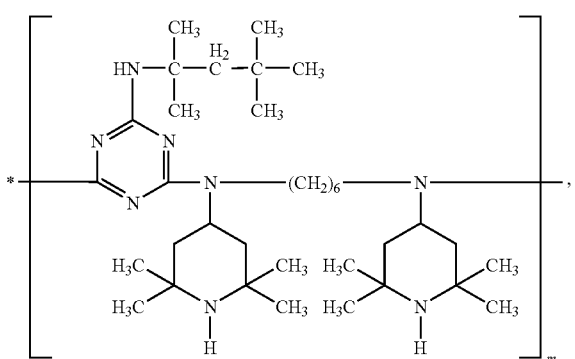
(VI)
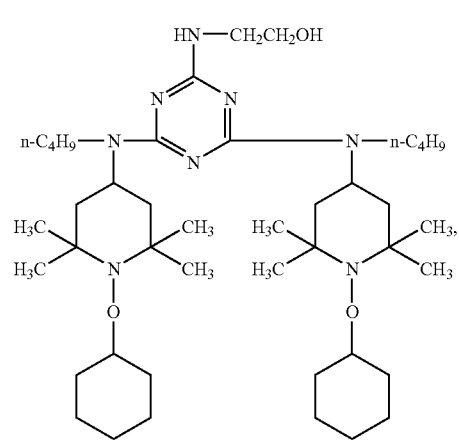
(VII)
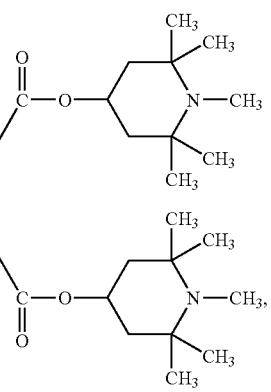
(VIII)
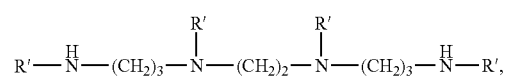
(VIV)
$$R'-\overset{H}{N}-(CH_2)_3-\overset{R'}{N}-(CH_2)_2-\overset{R'}{N}-(CH_2)_3-\overset{H}{N}-R',$$ (X)
wherein R' is of formula (X(i))
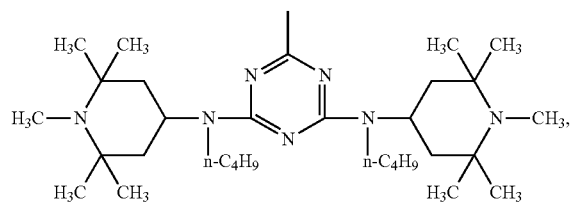
(X(i))
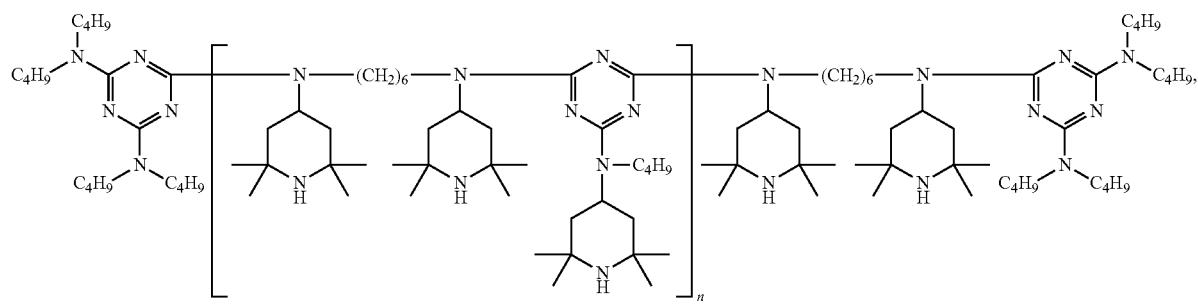
(XI)

-continued
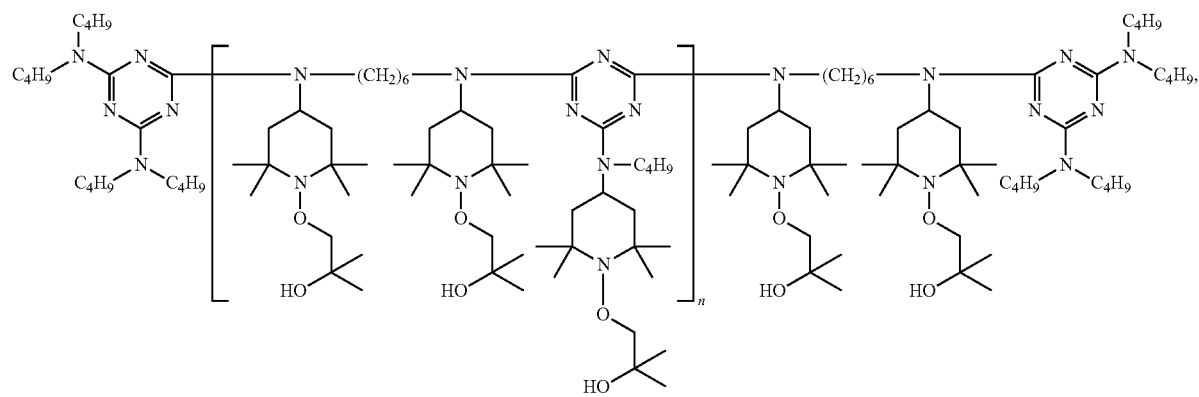
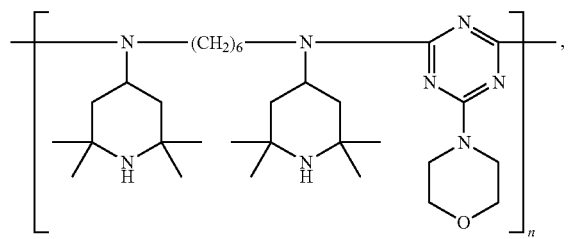
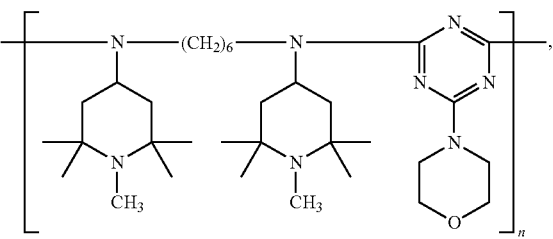
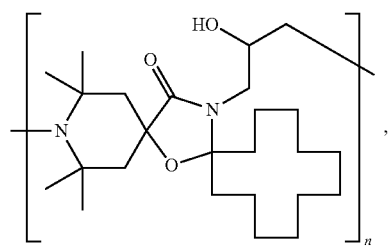
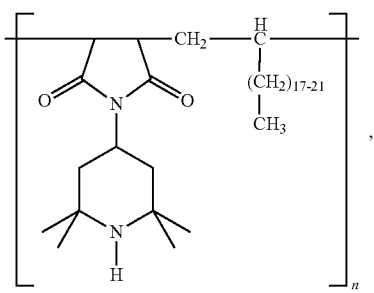
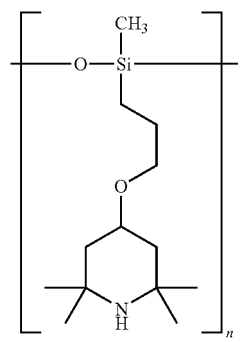
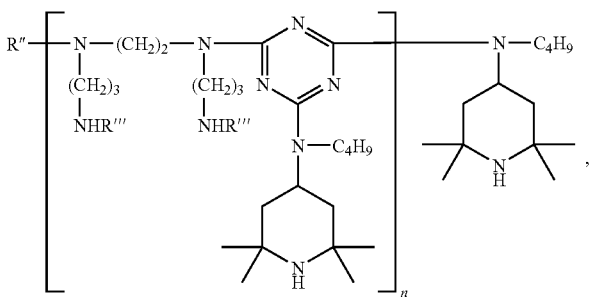

wherein
R is hydrogen or R; and
R is of formula (XVIV(i))

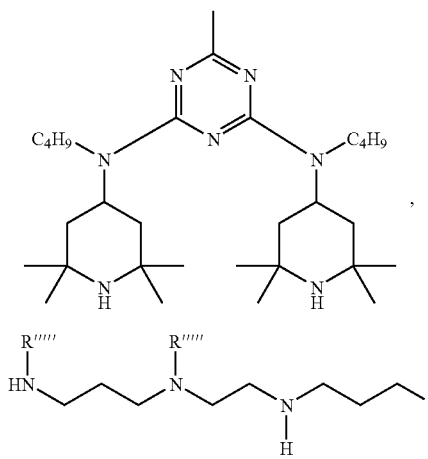
(XVIV(i))

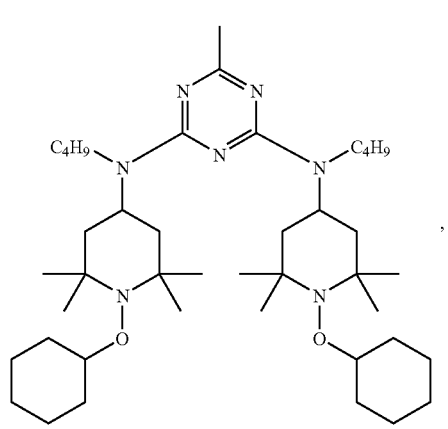
(XX)

R is of formula (XX(i))

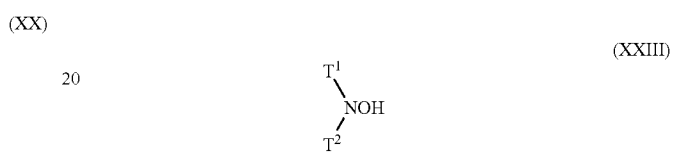
(XX(i))

Moreover, in another embodiment of the present subject matter, the non-phenolic stabilizer can be selected from at least one sterically hindered amine, including but not limited to, hydroxy-substituted N-alkoxy hindered amines. Non-limiting examples of such compounds can be found in U.S. Pat. No. 6,392,041, which is incorporated herein by reference in its entirety.

In a particular embodiment, the present non-phenolic stabilizer can comprise at least one hindered amine in an amount ranging from about 0.005% to about 10% by weight, more preferably from about 0.007% to about 5% by weight, and even more preferably from about 0.01% to about 3% by weight, based on a total weight of the irradiated polymer composition. In yet another preferred embodiment, the non-phenolic stabilizer can comprise at least one hydroxylamine, wherein the hydroxylamine is of formula (XXIII):

$$\begin{array}{c} T^1 \\ \diagdown \\ N-OH \\ \diagup \\ T^2 \end{array}$$
(XXIII)

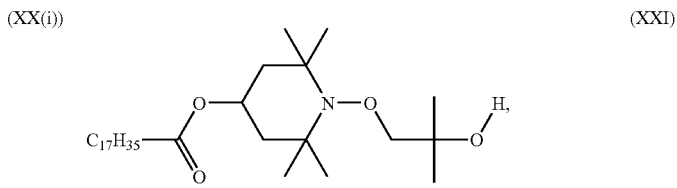
(XXI)

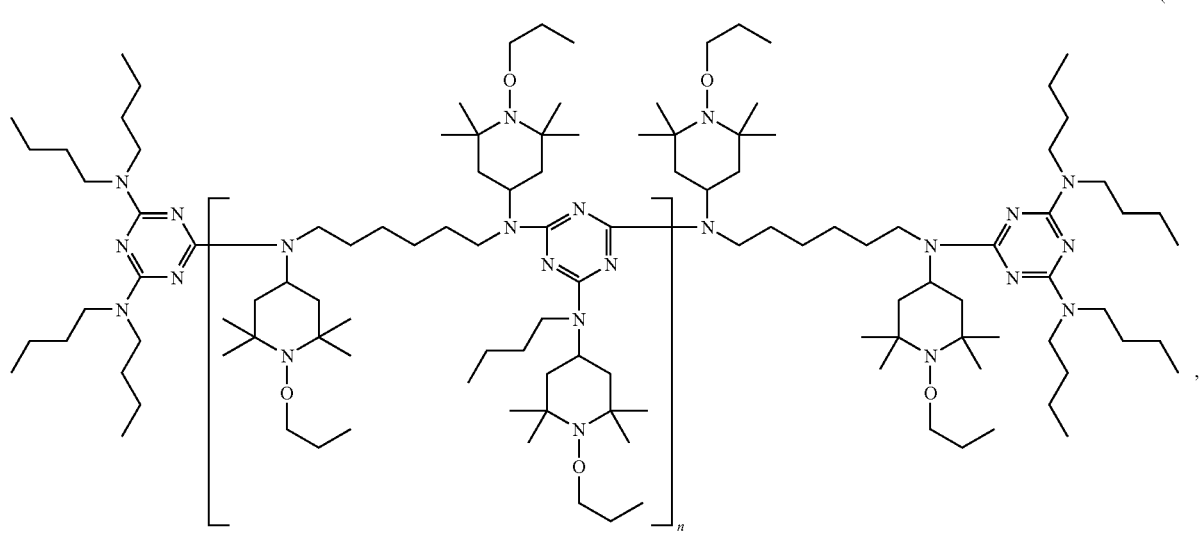
(XXII)

and combinations thereof.

wherein
T$^1$ is a C$_1$-C$_{36}$ straight or branched chain alkyl, a C$_5$-C$_{12}$ cycloalkyl, or a C$_7$-C$_9$ aralkyl, the C$_7$-C$_9$ aralkyl optionally being substituted by at least one C$_1$-C$_{12}$ alkyl or by at least one halogen atom; and T$^2$ is hydrogen or a C$_1$-C$_{36}$ straight or branched chain alkyl, a C$_5$-C$_{12}$ cycloalkyl, or a C$_7$-C$_9$ aralkyl, the C$_7$-C$_9$ aralkyl optionally being substituted by at least one C$_1$-C$_{12}$ alkyl or by at least one halogen atom.

Even more so, in yet another embodiment of the present subject matter, the hydroxylamine of formula (XXIII) can include N,N-dihydrocarbylhydroxylamines, wherein T$^1$ and T$^2$ are identical or different, and each can be independently of one another, benzyl, methyl, ethyl, octyl, lauryl, dodecyl, tetradecyl, hexadecyl, heptadecyl or octadecyl, or T$^1$ and T$^2$ can each be an alkyl combination conventionally found in a hydrogenated tallow amine. Non-limiting examples of N,N-dihydrocarbylhydroxylamines include N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine, N,N-di(hydrogenated tallow)hydroxylamine, and combinations thereof.

Additionally, in yet another embodiment, the hydroxylamine of formula (XXIII) can include at least one N,N-di(alkyl)hydroxylamine, which can be produced by a process including a direct oxidation of N,N-di(hydrogenated tallow) amine (Irgastab®, FS-042, commercially available from Ciba Specialty Chemicals Corp.).

In yet another embodiment of the present subject matter, the non-phenolic stabilizer can comprise at least one nitrone. Moreover, in another embodiment, the nitrone can comprise at least one oxidation product of the hydroxylamines of formula (XXIII). Non-limiting examples of nitrones include N-benzyl-α-phenylnitrone, N-ethyl α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone, at least one nitrone derived from N,N-di(hydrogenated tallow)hydroxylamine, and combinations thereof.

Even more so, in yet another embodiment, the non-phenolic stabilizers of the present subject matter can comprise at least one amine oxide, wherein the amine oxide is of formula (XXIV):

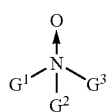

(XXIV)

wherein
G$^1$ and G$^2$ are identical or different, and are each independently of one another, a C$_6$-C$_{36}$ straight or branched alkyl, a C$_6$-C$_{12}$ aryl, a C$_7$-C$_{36}$ aralkyl, a C$_7$-C$_{36}$ alkaryl, a C$_5$-C$_{36}$ cycloalkyl, a C$_6$-C$_{36}$ alkcycloalkyl, or a C$_6$-C$_{36}$ cycloalkylalkyl;

G$^3$ is a C$_1$-C$_{36}$ straight or branched chain alkyl, a C$_6$-C$_{12}$ aryl, a C$_7$-C$_{36}$ aralkyl, a C$_7$-C$_{36}$ alkaryl, a C$_5$-C$_{36}$ cycloalkyl, a C$_6$-C$_{36}$ alkcycloalkyl, or a C$_6$-C$_{36}$ cycloalkylalkyl;

with the proviso that at least one of G$^1$, G$^2$ and G$^3$ comprise a β carbon-hydrogen bond, and the aforementioned alkyl, aralkyl, alkaryl, cycloalkyl, alkcycloalkyl and cycloalkylalkyl groups of G$^1$, G$^2$, and G$^3$ optionally comprise at least one heteroatom-containing group, the heteroatom containing group being selected from the group consisting of —O—, —S—, —SO—, —SO$_2$—, —COO—, —OCO—, —CO—, —NG$^4$-, —CONG$^4$-, —NG$^4$CO—, and combinations thereof, and the aforementioned alkyl, aralkyl, alkaryl, cycloalkyl, alkcycloalkyl and cycloalkylalkyl groups are optionally substituted by at least one group selected from □OG$^4$, —SG$^4$, —COOG$^4$, —OCOG$^4$, —COG$^4$, —N(G$^4$)$_2$, —CON(G$^4$)$_2$, —NG$^4$COG$^4$ and 5- and 6-membered rings comprising —C(CH$_3$)(CH$_2$R$^z$)NL(□CH$_2$R$^z$)(CH$_3$)C—; wherein G$^4$ are identical or different, and are independently of one another, hydrogen or a C$_1$-C$_8$ alkyl;

R$^z$ is hydrogen or methyl;

L □is a C$_1$-C$_{30}$ straight or branched chain alkyl, —C(O)R,□or OR;□and

R□is a C$_1$-C$_{30}$ straight or branched chain alkyl.

In another embodiment, the non-phenolic stabilizers of the present subject matter can comprise at least one amine oxide of formula (XXIV), wherein G$^1$ and G$^2$ can be identical or different, and can each be independently of one another benzyl, wherein the benzyl can be optionally substituted. In yet another embodiment, G$^1$ and G$^2$ of the amine oxide can be identical or different, and can each be independently of one another a C$_8$-C$_{26}$ alkyl, more preferably a C$_{10}$-C$_{26}$ alkyl.

Additionally, in further embodiments G$^3$ of the amine oxide can be a C$_1$-C$_{22}$ alkyl, including but not limited to methyl, wherein the methyl can be optionally substituted, and G$^1$, G$^2$, and G$^3$ of the amine oxide can be identical or different, and can each be independently of one another, a C$_6$-C$_{36}$ alkyl.

In yet a further embodiment, the non-phenolic stabilizer of the present subject matter can comprise at least one poly (amine oxides). Useful embodiments of poly(amine oxides) of the present subject matter include, but are not limited to tertiary amine oxides comprising at least two tertiary amine oxides per compound. Non-limiting examples of useful poly (amine oxides), include tertiary amine oxide analogues of aliphatic and alicyclic diamines, including, but are not limited to, 1,4-diaminobutane, 1,6-diaminohexane, 1,10-diaminodecane, 1,4-diaminocyclohexane, and combinations thereof, and aromatic based diamines, including, diamino anthraquinones, diaminoanisoles, and combinations thereof.

Moreover, in yet a further embodiment of the present subject matter, the non-phenolic stabilizer can comprise at least one tertiary amine oxides derived from oligomers and polymers of the aforementioned diamines. Non-limiting examples of useful amine oxides derived from oligomers and polymers of the aforementioned diamines include at least one amine oxide attached to at least one polymer, including amine oxides attached to at least one polyolefin, polyacrylate, polyester, polyamide, polystyrene, and mixtures thereof, wherein the amine oxide derived from oligomers and polymers of the aforementioned diamines may optionally comprise at least one heteroatom-containing moiety, including —O—, —S—, —SO—, —CO$_2$—, —CO—, —CONG$_4$-, and combinations thereof.

In yet another embodiment, $G^1$, $G^2$ and $G^3$ of the amine oxide of formula (XXIV) of the present subject matter may be attached to a molecule comprising at least one hindered amine. Non-limiting examples of useful hindered amines include those described in U.S. Pat. Nos. 6,664,317 and 6,872,764, both of which are incorporated herein by reference in their entirety.

Furthermore, in yet another embodiment, the non-phenolic stabilizers of the present subject matter can comprise at least one benzofuranone, wherein the benzofuranone is of formula (XXV):

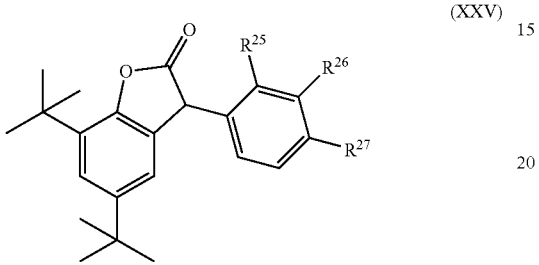
(XXV)

wherein
$R^{25}$, $R^{26}$, and $R^{27}$ are identical or different, and are each be independently of one another, hydrogen, a $C_1$-$C_{10}$ alkyl, a $C_2$-$C_{10}$ alkenyl, a $C_3$-$C_{10}$ aryl, and an arylalkyl comprising from 1 to 10 carbon atoms in the alkyl part and from 3 to 10 carbon atoms in the aryl part.

In a preferred embodiment, $R^{25}$, $R^{26}$, and $R^{27}$ of the benzofuranone of formula (XXV) can be, independently of each other, hydrogen and methyl.

Non-limiting examples of useful benzofuranones of the present subject matter include those described in U.S. Pat. Nos. 4,325,863, 4,338,244, 5,175,312, 5,216,052, 5,252,643, 5,369,159, 5,488,117, 5,356,966, 5,367,008, 5,428,162, 5,428,177, 5,614,572, 5,883,165, and 5,516,920, all of which are all incorporated herein by reference in their entirety. Additionally, further non-limiting examples of useful benzofuranones of the present subject matter include 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one, and mixtures thereof.

In a particular embodiment, the present non-phenolic stabilizer can comprise at least one hydroxylamine, nitrone, amine oxide, benzofuranone, and mixtures thereof in an amount ranging from about 0.005% to about 10% by weight, more preferably from about 0.007% to about 5% by weight, and even more preferably from about 0.01% to about 3% by weight, based on a total weight of the irradiated polymer composition.

In yet another embodiment, the non-phenolic stabilizers of the present subject matter can comprise at least one organic phosphite, phosphonite, or mixtures thereof, wherein the organic phosphite and phosphonite comprise at least one formula selected from (XXVI), (XXVII), (XXVIII), (XXVIV), (XXX), (XXXI), and (XXXII):

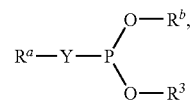
(XXVI)

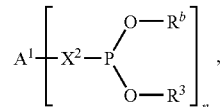
(XXVII)

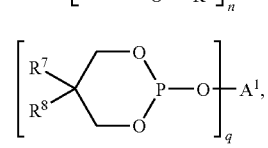
(XXVIII)

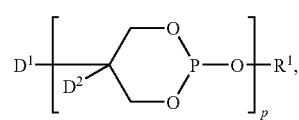
(XXVIV)

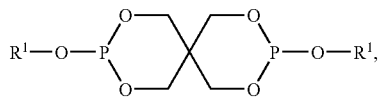
(XXX)

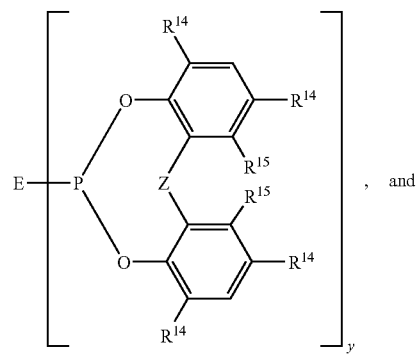
(XXXI)

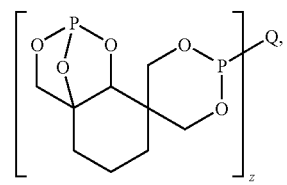
(XXXII)

wherein
n is 2, 3 or 4;
p is 1 or 2;
q is 2 or 3;
r is 4 to 12;
y is 1, 2 or 3; and
z is 1 to 6;
$A^1$, if n and/or q is 2, is a $C_2$-$C_{18}$ alkylene, a $C_2$-$C_{12}$ alkylene comprising at least one oxygen, sulfur, —$NR_4$—, or combinations thereof, phenylene, or a radical comprising formula (XXXIII) or (XXXIV):

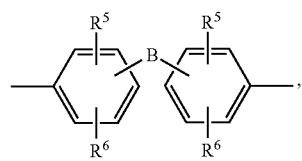
(XXXIII)

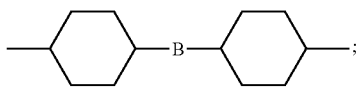 (XXXIV)

$A^1$, if n and/or q is 3, is a radical —$C_rH_{2r-1}$—;
$A^1$, if n is 4, is

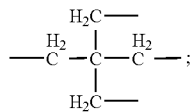 (XXXV)

$A^2$ is a $C_2$-$C_{18}$ alkylene, a $C_2$-$C_{12}$ alkylene comprising at least one oxygen, sulfur, —$NR_4$—, or combinations thereof, phenylene, or a radical comprising formula (XXXIII) or (XXXIV):

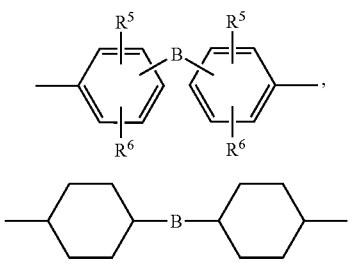

B is a direct bond, —$CH_2$—, —$CHR^4$—, —$CR^1R^4$—, sulfur, a $C_5$-$C_7$ cycloalkylidene, or a $C_5$-$C_7$ cyclohexylidene, wherein the $C_5$-$C_7$ cycloalkylidene and the $C_5$-$C_7$ cyclohexylidene is optionally substituted in at least one 3, 4 and 5 position with at least one $C_1$-$C_4$ alkyl radical;

$D^1$, if p is 1, is a $C_1$-$C_4$ alkyl;
$D^1$, if p is 2, is —$CH_2OCH_2$—;
$D^2$, if p is 1, is a $C_1$-$C_4$ alkyl;
$D^2$, if p is 2, is a $C_1$-$C_4$ alkyl or —$CH_2OCH_2$—;
E, if y is 1, is a $C_1$-$C_{18}$ alkyl, —$OR_1$, or halogen;
E, if y is 2, is —O-$A^2$-O—;
E, if y is 3, is a $R^4C(CH_2O)\square_3$, or $N(CH_2CH_2O)\square_3$;
Q is a radical of a z-valent alcohol or phenol, wherein Q is attached to the phosphorus atom in formula (XXXII) via an oxygen in the z-valent alcohol or phenol;
$R^a$, $R^b$, and $R^3$ are identical or different, and are each independently of one another, a $C_1$-$C_{18}$ alkyl optionally comprising at least one oxygen, sulfur, or $\square NR^4$, $\square$wherein $R^1$, $R^2$, and $R^3$ are each, independently of each other, optionally substituted by at least one halogen, —$COOR^4$, —CN, —$CONR^4R^4$, $C_7$-$C_9$ phenylalkyl, $C_5$-$C_{12}$ cycloalkyl, phenyl optionally substituted with at least one halogen, $C_1$-$C_3$ alkyl, or $C_1$-$C_{18}$ alkoxy, naphthyl optionally substituted with at least one halogen, $C_1$-$C_3$ alkyl, or $C_1$-$C_{18}$ alkoxy, $C_7$-$C_9$ phenylalkyl, or a radical of formula (XXXVI):

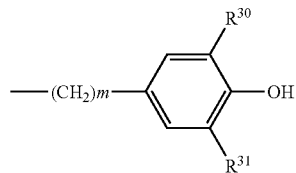 (XXXVI)

wherein
m is an integer ranging from 3 to 6;
$R^4$ is hydrogen, a $C_1$-$C_{18}$ alkyl, a $C_5$-$C_{12}$ cycloalkyl, or a $C_7$-$C_9$ phenylalkyl;
$R^{30}$ and $R^{31}$ are identical or different, and are each independently of one another, hydrogen, a $C_1$-$C_8$ alkyl, or a $C_5$-$C_6$ cycloalkyl;
$R^7$ and $R^8$, if q is 2, are each identical or different, and each independently of one another, are a $C_1$-$C_4$ alkyl, or together form a 2,3-dehydropentamethylene radical;
$R^7$ and $R^8$, if q is 3, are methyl;
$R^{14}$ are each, identical or different, and are each independently of one another, hydrogen, a $C_1$-$C_9$ alkyl, or cyclohexyl;
$R^{15}$ are each, identical or different, and are each independently of one another, hydrogen or methyl;
$X^2$ and Y are each, identical or different, and are each independently of one another, a direct bond or oxygen;
Z is a direct bond, methylene, —$C(R^{16})_2$—, or sulfur; and
$R^{16}$ are each, identical or different, and are each independently of one another, a $C_1$-$C_8$ alkyl.

In several preferred embodiments, the non-phenolic stabilizers of the present subject matter can comprise at least one organic phosphite, phosphonite, or mixtures thereof, wherein the organic phosphite and phosphonite comprise at least one formula of (XXVI), (XXVII), (XXX), and (XXXI), wherein n can be 2, y can be 1, 2 or 3, $A^1$ can be a $C_2$-$C_{18}$-alkylene, p-phenylene, or p-biphenylene, E, if y is 1, can be a $C_1$-$C_{18}$-alkyl, —$OR^1$, or fluorine, E, if y is 2, can be p-biphenylene, E, if y is 3, can be $N(CH_2CH_2O—)_3$, $R^1$, $R^2$ and $R^3$ can be identical or different, and can each be independently of one another a $C_1$-$C_{18}$-alkyl, a $C_7$-$C_9$-phenylalkyl, cyclohexyl, and phenyl, wherein the $C_1$-$C_{18}$-alkyl, $C_7$-$C_9$-phenylalkyl, cyclohexyl, and phenyl can each be optionally substituted with at least one $C_1$-$C_3$-alkyl, $R^{14}$ can be hydrogen or a $C_1$-$C_9$-alkyl, $R^{15}$ can be hydrogen or methyl, X can be a direct bond, Y can be oxygen, Z can be a direct bond or —$CH(R^{16})$—, and $R^{16}$ can be a $C_1$-$C_4$-alkyl.

Moreover, in several preferred embodiments, the non-phenolic stabilizers of the present subject matter can comprise at least one organic phosphite, phosphonite, or mixtures thereof, wherein the organic phosphite and phosphonite comprise at least one formula of (XXVI), (XXVII), (XXX), and (XXXI), wherein n can be 2, y can be 1 or 3, $A^1$ can be p-biphenylene, E, if y is 1, can be a $C_1$-$C_{18}$-alkoxy, or fluorine, E, if y is 3, can be $N(CH_2CH_2O—)_3$, $R^1$, $R^2$, and $R^3$ can be identical or different, and can each be independently of one another a $C_1$-$C_{18}$-alkyl or phenyl, wherein the $C_1$-$C_{18}$-alkyl and phenyl can each be optionally substituted by 2 or 3 $C_2$-$C_{12}$-alkyls, $R^{14}$ can be methyl or tert-butyl, $R^{15}$ can be hydrogen, X can be a direct bond, Y can be oxygen, and Z can be a direct bond, methylene, or —$CH(CH_3)$—.

In yet another embodiment of the present subject matter, the non-phenolic stabilizer can comprise at least one organic phosphite, phosphonite, or mixtures thereof, wherein the organic phosphite and/or phosphonite can comprise formula (XXXVII):

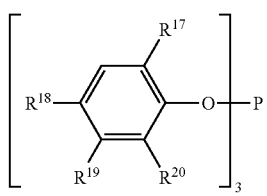

(XXXVII)

wherein
$R^{17}$ and $R^{18}$ are each identical or different, and are each independently of one another, hydrogen, a $C_1$-$C_8$ alkyl, a cyclohexyl, or phenyl; and
$R^{19}$ and $R^{20}$ are each identical or different, and are each independently of one another, hydrogen, or a $C_1$-$C_4$ alkyl.

Non-limiting examples of useful organic phosphites and phosphonites of formula (XXXVII) of the present subject matter include triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite (Irgafos® 168, commercially available from Ciba Specialty Chemicals Corp.), diisodecyl pentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxy-pentaerythritol diphosphite, bis(2,4-di-tert-butyl-6-methylphenyl) pentaerythritol diphosphite, bis(2,4,6-tri-tert-butylphenyl)pentaerythritol diphosphite, tristearyl sorbitol triphosphite, tetrakis(2,4-di-tert-butylphenyl) 4,4'-biphenylenediphosphonite (Irgafos® P-EPQ, commercially available from Ciba Specialty Chemicals Corp.), 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl) methyl phosphite, tris(nylpnyl)phosphate, bis(2,4-di-tert-butyl-6-methylphenyl)ethyl phosphite (Irgafos® 38, commercially available from Ciba Specialty Chemicals Corp.), bis(2,4-di-tert-butylphenyl)pentaerythritol diphosphite (Ultranox® 626, commercially available from GE Chemicals), 2,2',2"-nitrilo[triethyltris(3,3'5,5'-tetra-tert-butyl-1,1'-biphenyl-2,2'-diyl)phosphite] (Irgafos® 12, commercially available from Ciba Specialty Chemicals Corp.), Ultranox® 641 (commercially available from GE Chemicals), Dover-phos® S9228 (commercially available from Dover Chemicals) or Mark® HP10 (commercially available from Adeka Argus)

In a particular embodiment, the present non-phenolic stabilizer can comprise at least one organic phosphite, phosphonite, and mixtures thereof in an amount ranging from about 0.005% to about 10% by weight, more preferably from about 0.007% to about 5% by weight, and even more preferably from about 0.01% to about 3% by weight based on a total weight of the irradiated polymer composition.

In a particularly preferred embodiment, the non-phenolic stabilizer of the present subject matter comprises at least one hindered amine selected from Chimassorb® 944, Tinuvin® 622, Chimassorb® 2020, Chimassorb® 119, Tinuvin® 770, and mixtures thereof, separate or in combination with at least one hydroxylamine, nitrone, amine oxide, or benzofuranone selected from N,N-di(hydrogenated tallow)amine (Irgastab® FS-042), an N,N-di(alkyl)hydroxylamine produced by a direct oxidation of N,N-di(hydrogenated tallow)amine (Irgastab® FS-042), N-octadecyl-α-heptadecylnitrone, Genox™ EP, a di($C_{16}$-$C_{18}$)alkyl methyl amine oxide, 3-(3,4-dimethylphenyl)-5,7-di-tert-butyl-benzofuran-2-one, Irganox® HP-136 (BF1), and mixtures thereof, and separate or in combination with at least one organic phosphite or phosphonite selected from tris(2,4-di-tert-butylphenyl)phosphite (Irgafos® 168). In particular, in a preferred embodiment, the non-phenolic stabilizers of the present subject matter can include those described in U.S. Pat. Nos. 6,664,317 and 6,872,764, both of which are incorporated herein by reference in their entirety.

Processes for Producing the Irradiated Polymer Compositions

The irradiated polymer compositions of the present subject matter can be produced by a variety of processes.

However, in a preferred embodiment of the present subject matter, the irradiated polymer compositions are produced by mixing at least one polyolefin resin with at least one non-phenolic stabilizer to form an intermediate polyolefin resin. The polyolefin resin and non-phenolic stabilizer can be mixed by a variety of processes well known to those skilled in the art, which include but are not limited to melt blending, dry blending, extruding, and combinations thereof.

Additionally, in a preferred embodiment, after mixing at least one polyolefin resin with at least one non-phenolic stabilizer to form an intermediate polyolefin resin, the intermediate polyolefin resin is then exposed to a total dosage of about 2 Megarad to about 20 Megarad of radiation, in a reduced oxygen environment without significant gelation of the intermediate polyolefin resin, wherein the controlled, predetermined, reduced oxygen environment comprises less than 15% by volume of active oxygen, with respect to a total volume of the reduced oxygen environment, and the level of active oxygen in the environment is maintained or reduced during the process.

The expression "active oxygen" throughout this disclosure refers to oxygen in a form that will react with the intermediate irradiated polyolefin resin, and more particularly to free radicals present in the intermediate irradiated polyolefin resin, which are produced from the irradiation process. The expression ☐active oxygen ☐throughout this disclosure can include, but is not limited to, molecular oxygen, which is the form of oxygen normally found in air. In another preferred embodiment, the active oxygen content requirement of the process of the present subject matter can be achieved by use of at least one vacuum, or by replacing part or all of the air in the reduced oxygen environment in which the irradiation treatment will occur, by an inert gas, including, but not limited to, nitrogen.

Moreover, the term "rad" is usually defined as a quantity of ionizing radiation that results in an absorption of 100 ergs of energy per gram of irradiated material, regardless of the source of radiation. With regard to the present subject matter, the amount of energy absorbed by the intermediate polyolefin resin when it is irradiated usually is not determined. However, the process can be carried out such that the energy absorption from the ionizing radiation can be measured by a conventional dosimeter, which is a measuring device comprising a strip of fabric, film, or combination thereof, wherein the strip of fabric, film, or combination thereof comprises a radiation sensitive dye. This radiation sensitive dye can be used as an energy absorption sensing means. Accordingly, as used throughout this disclosure, the term "rad" means a quantity of ionizing radiation resulting in an absorption of the equivalent of 100 ergs of energy per gram of fabric, film, or combination thereof comprising the radiation sensitive dye of the dosimeter placed at a surface of the intermediate polyolefin resin being irradiated, regardless of the form of the intermediate polyolefin resin at the time of irradiation.

In yet another embodiment of the present subject matter, the process for producing the irradiated polymer composition can comprise, between mixing the polyolefin resin with the non-phenolic stabilizer to produce the intermediate polyolefin resin, and irradiating the intermediate polyolefin resin to produce the intermediate irradiated polyolefin resin, the intermediate polyolefin resin can be maintained in the reduced oxygen environment in which the active oxygen concentration is less than about 15% by volume, preferably less than 5% by volume, and more preferably less than 0.004% by volume, with respect to a total volume of the reduced oxygen environment. Moreover, in another preferred embodiment of the present invention, the intermediate polyolefin resin can be kept above a glass transition temperature relating to any amorphous fraction present in the intermediate polyolefin resin, if such a fraction is present in the intermediate polyolefin resin. In another particularly preferred embodiment, the glass transition temperature of any amorphous fraction present in the intermediate polyolefin resin can be less than about 40° C., and preferably at about 25° C.

In another preferred embodiment, the radiation from the irradiation treatment can be gamma radiation or electron beam radiation, with the radiation preferably being electron beam radiation. Additionally, in a preferred embodiment, the radiation can be formed from electrons being beamed from an electron generator comprising an accelerating potential of 500-10,000 kilovolts.

In an embodiment of the present subject matter in which the intermediate polyolefin resin does not comprise an amount of polymerized diene, satisfactory results can be obtained at a total radiation dose of from about 1 Megarad to about 20 Megarad, preferably from about 1.5 Megarad to about 18 Megarad, and most preferably from about 2 Megarad to about 15 Megarad. Moreover, in a preferred embodiment of the present subject matter, the total radiation dosage can be delivered at a dose rate of about 1 megarad to about 10,000 megarad per minute, and preferably at about 18 megarad to about 2,000 megarad per minute to arrive at the aforementioned total radiation dosages.

In an embodiment of the present subject matter in which the intermediate polyolefin resin comprises an amount of polymerized diene, satisfactory results can be obtained at a total radiation dose of about 0.25 Megarad to about 1.5 Megarad, preferably about 0.5 Megarad to about 1.5 Megarad, which can be delivered at the aforementioned dose rates.

In yet another embodiment of the present subject matter, the intermediate polyolefin resin is exposed to a requisite dosage of radiation for a time period sufficient to form a substantial amount of chain scission within the intermediate polyolefin resin to form the intermediate irradiated polyolefin resin. In a preferred embodiment, the intermediate polyolefin resin is exposed to a requisite dosage of radiation for a time period ranging from about 0.0001 seconds to several days, for a total radiation exposure of about 1 Megarad to about 20 Megarad, to form the intermediate irradiated polyolefin resin. The time period of exposure is based on the type of radiation being used, such as gamma or electron beam, and the irradiation rate. The time of exposure, depending on the desired end results, can be formulated by those skilled in the art.

In additionally preferred embodiments of the present subject matter, the total radiation exposure can range from about 1.5 Megarad to about 18 Megarad, and more preferably can range from about 2 Megarad to about 15 Megarad, and the active oxygen in the reduced oxygen environment can be in an established and maintained concentration of less than about 5% by volume, more preferably less than about 0.004% by volume, with respect to a total volume of the reduced oxygen environment.

Additionally, when the intermediate polyolefin resin is being irradiated in the reduced oxygen environment, the radiation should have sufficient energy to penetrate, to the extent desired, the intermediate polyolefin resin. Accordingly, in a preferred embodiment of the present subject matter, the radiation must be sufficient to ionize the molecular structure of the intermediate polyolefin resin and to excite the atomic structure of the intermediate polyolefin resin, but not sufficient to affect atomic nuclei within the intermediate polyolefin resin.

After the intermediate polyolefin resin has been exposed to the requisite dosage of radiation to form the intermediate irradiated polyolefin resin, in an embodiment of the present subject matter, the intermediate irradiated polyolefin resin is then maintained in the reduced oxygen environment for a period of time sufficient for a significant amount of long chain branches to form within the intermediate irradiated polyolefin resin. In a preferred embodiment, the intermediate irradiated polyolefin resin is maintained in the reduced oxygen environment after exposure to the radiation for about one minute to up to several days, more preferably for about 1 minute to about 5 hours. In another preferred embodiment, a minimum amount of time is needed for sufficient migration of polyolefin resin chain fragments to free radical sites, to reform complete chains, or to form long branches on the chains. In an alternative embodiment of the present subject matter, the intermediate irradiated polyolefin resin can be maintained in the reduced oxygen environment for a period of time of less than one minute, for example, about a half minute, however, the resulting free-end long chain branching is typically lower.

Additionally, during the holding step in another embodiment, the intermediate irradiated polyolefin resin can be kept at ambient temperature or at an elevated temperature, with preferably the elevated temperature ranging from 20° C. to 110° C.

With regard to treating the intermediate irradiated polyolefin resin formed from the polyolefin resin being exposed to radiation, while the intermediate irradiated polyolefin resin is in the reduced oxygen environment and after the irradiation treatment, the present subject matter includes substantially deactivating all free radicals present in the intermediate irradiated polyolefin resin by a deactivation step, quenching step, or combination thereof. In several embodiments, the deactivation step, quenching step, or combination thereof can be performed by applying heat, adding an additive which functions as a free radical trap, including but not limited to, methyl mercaptan, or a combination of both.

Moreover, in another embodiment of the present subject matter, the deactivation step, quenching step, or combination thereof, can be done at a temperature ranging from about 20° C. to about 200° C., more preferably from about 100° C. to about 150° C.

In yet another embodiment of the present subject matter, the intermediate irradiated polyolefin resin is exposed to a heating treatment after the irradiation treatment, the heating treatment comprising extruding the intermediate irradiated polyolefin resin at about 200° C., which can essentially melt the intermediate irradiated polyolefin resin, and can consequently substantially deactivate all of the free radicals in the intermediate irradiated polyolefin resin. Additionally, in yet further embodiments of the present subject matter, prior to extruding or melt compounding the intermediate irradiated polyolefin resin, the intermediate irradiated polyolefin resin can be blended with at least one additive polymer, including but not limited to propylene homopolymers, propylene copolymer, propylene terpolymers, ethylene homopolymers, ethylene copolymers, ethylene terpolymers, butene homopolymer, butene copolymer, butene terpolymers, plastomers, and combinations thereof. Additionally, in another preferred embodiment, at least one additive including but not limited to stabilizers, pigments, fillers, and combinations thereof can also be added prior to extruding or melt compounding the intermediate irradiated polyolefin resin.

Further embodiments of the present subject matter can include introducing the intermediate irradiated polyolefin resin into at least one fluidized bed or a staged fluid bed system comprising a fluidizing medium, the fluidizing medium comprising at least one inert gas, including but not limited to, nitrogen, wherein the bed or beds can be established and maintained at a temperature ranging from at least about 60° C. to about 160° C., and preferably about 80° C. to about 140° C., with the average residence time of the intermediate irradiated polyolefin resin in the fluid bed or beds comprising from about 5 minutes to about 120 minutes, and preferably from about 20 minutes to about 30 minutes.

In a particularly preferred embodiment of the present subject matter, the intermediate polyolefin resin comprising at least one polyolefin resin and at least one non-phenolic stabilizer can be first extruded into a pelletized form, with the intermediate polyolefin resin in pelletized form then being irradiated in the aforementioned reduced oxygen environment. In particular, in a preferred embodiment of the present subject matter, the polyolefin resin can be introduced into a extruder, with the non-phenolic stabilizer added prior, during, after, or a combination thereof, to the extrusion process to produce the intermediate polyolefin resin in pelletized form, with the intermediate polyolefin resin in pelletized form then being irradiated to achieve the aforementioned total irradiation dosage, in the aforementioned reduced oxygen environment, to produce an intermediate irradiated polyolefin resin, maintaining the pelletized intermediate irradiated polyolefin resin in the aforementioned reduced oxygen environment, and then subsequently treating the pelletized intermediate irradiated polyolefin resin, to substantially deactivate all the free radicals present in the pelletized intermediate irradiated polyolefin resin, to produce the irradiated polymer compositions of the present subject matter. The irradiation processes of the present subject matter can comprise exposing the intermediate polyolefin resin to a single irradiation treatment or multiple irradiation treatments.

In a preferred embodiment of the present subject matter, useful irradiated processes in a reduced oxygen environment include those described in U.S. Pat. Nos. 4,916,198, 5,047, 446, 5,414,027, 5,508,319, 5,591,785, and 5,731,362, all of which are incorporated herein in their entirety.

Additives, Stabilizers, and Fillers

The irradiated polymer compositions of the present subject matter can further comprise, in addition to at least one non-phenolic stabilizer, conventional additives and stabilizers well known in the art.

However, as discussed previously, it has been unexpectedly found that by irradiating polymer compositions comprising at least one non-phenolic stabilizer in a reduced oxygen environment, the resultant polymer compositions comprise a better balance of physical properties, including lower melt flow rate ratios, higher melt tensions, and lower yellowing. Accordingly, any additives, stabilizers, fillers, or the like, added to the polyolefin resin of the present subject matter before, or after irradiation in the reduced oxygen environment, should not substantially negatively affect the better balance of physical properties of the irradiated polymer compositions of the present subject matter.

In this regard, the irradiated polymer compositions of the present subject matter can additionally comprise at least one additive, stabilizer, filler, or combination thereof. Additives, stabilizers, and fillers can include, but are not limited to, UV absorbers, including but not limited to, 2-(2-hydroxyphenyl)-2H-benzotriazoles, 2-hydroxybenzophenones, esters of substituted and unsubstituted benzoic acids, acrylates and malonates, oxamides, tris-aryl-o-hydroxyphenyl-s-triazines, and combinations thereof, metal deactivators, thiosynergists, peroxide scavengers, basic co-stabilizers, acid scavengers, nucleating agents, clarifiers, conventional fillers, dispersing agents, other additives, and combinations thereof, which can be added in amounts well known to those skilled in the art.

Non-limiting examples of UV absorbers useful in the present subject matter include those described in U.S. Pat. Nos. 3,004,896, 3,055,896, 3,072,585, 3,074,910, 3,189,615, 3,218,332, 3,230,194, 4,127,586, 4,226,763, 4,275,004, 4,278,589, 4,315,848, 4,347,180, 4,383,863, 4,675,352, 4,681,905, 4,853,471, 5,268,450, 5,278,314, 5,280,124, 5,319,091, 5,410,071, 5,436,349, 5,516,914, 5,554,760, 5,563,242, 5,574,166, 5,607,987, and 5,977,219, all of which are incorporated herein by reference in their entirety, and include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(Ω-hydroxy-octa-(ethyleneoxy)carbonyl-ethyl)-phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy-carbonylethyl)-2-hydrox3-phenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3, 5-di-α-cumylphenyl)-2H-benzotriazole, 5-chloro-2-(2-hydroxy-3,5-dioc-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl-3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5- di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole, 5-phenylsulfonyl-2-(2-hydroxy-3,5-di-t-butylhenyl)-2H-benzotriazole, 4-hydroxy, 4-methoxy, 4-octyloxy, 4-decyloxy, 4-dodecyloxy, 4-benzyloxy, 4,2',4'-trihydroxy, and 2'-hydroxy-4,4'-dimethoxy derivatives of benzophenones, 4☐-tertbutyl-phenyl salicylate, phenyl salicylate, octylphenyl salicylate, dibenzoyl resorcinol, bis(4☐-tert-butylbenzoyl)resorcinol, benzoyl resorcinol, 2,4-di-tert-butylphenyl, 3,5-di-tert-butyl-4-hydroxybenzcate, hexadecyl-3,5-di-tert-butyl-4-hydroxybenzoate, octadecyl-3,5-di-tert-butyl-4-hydroxbenzoate, 2-methyl-4,6-di-tert-butylphenyl, 3,5-di-tert-butyl-4-hydroxybenzoate, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS#7443-25-6), Sanduvor® PR$_{31}$, di-(1,2,2,6,6-pentamethylpiperidin-4-yl), p-methoxybenzylidenemalonate (CAS #147783-69-5), 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide, 2-ethoxy-2'-ethyl-5,4'-di-tert-butoxanilide, o- and p-methoxy-di-substituted oxanilides, o- and p-ethoxy-di-substituted oxanilides, tris-aryl-o-hydroxyphenyl-s-triazines, triazines described in WO 96/28431, EP 434608, EP 941989, GB 2,317,893, U.S. Pat. Nos. 3,843,371, 4,619,956, 4,740,542, 5,096,489, 5,106,891, 5,298,067, 5,300,414, 5,354,794, 5,461,151, 5,476,937, 5,489,503, 5,543,518, 5,556,973, 5,597,854, 5,681,955, 5,726,309, 5,942,626, 5,959,008, 5,998,116, and 6,013,704, all of which are incorporated herein by reference in their entirety, and include, but are not limited to, 4,6-bis-(2,4-dimethylphenyl)-2-(2-hydroxy-4-octyloxyphenyl)-s-triazine, Cyasorb® 1164, (commercially available from Cytec Corp.), 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxyphenyl]-6-(4-chlorophenyl)-s-triazine, 2,4-bis(2,4-dihydroxyphenyl)-6-(2,4-dimethylphenyl)-s-triazine, 2,4-bis (4-biphenyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxy propyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylhenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxy-phenyl)-s-triazine, 2,4-bis(2,4-dimethylphenyl)-6-(2-hydroxy-4-hexyloxy-5-cumylphenyl)-s-triazine, 2-(2,4,6-trimethylphenyl)-4,6-bis[2-hydroxy-4-(3-butyloxy-2-hydroxapropyloxy)phenyl]-s-triazine, 2,4,6-tris [2-hydroxy-4-(3-sec-butyloxy-2-hydroxypropyloxy) phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylhenyl)-2-(2-hydroxy-4-(3-tridecyloxy-2-hydroxypropoxy)-phenyl)-s-triazine, Tinuvin® 400, (commercially available from Ciba Specialty Chemicals Corp.), 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures thereof.

Non-limiting examples of metal deactivators useful in the present subject matter include N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyldihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide, and mixtures thereof.

Non-limiting examples of thiosynergists useful in the present subject matter include dilauryl thiodipropionate, distearyl thiodipropionate, and mixtures thereof.

Non-limiting example of peroxide scavengers useful in the present subject matter include esters of b-thiodipropionic acid, including the lauryl, stearyl, myristyl and tridecyl esters of b-thiodipropionic acid, mercaptobenzimidazole and the zinc salt of 2-mercaptobenzimidazole, zinc dibutyldithiocarbamate, dioctadecyl disulfide, pentaerythritol tetrakis(b-dodecylmercapto)propionate, and mixtures thereof.

Non-limiting examples of basic co-stabilizers useful in the present subject matter include melamine, polyvinylpyrrolidone, dicyandiamide, triallyl cyanurate, urea derivatives, hydrazine derivatives, amines, polyamides, polyurethanes, and mixtures thereof.

Non-limiting examples of acid scavengers useful in the present subject matter include zinc oxide, calcium lactate, dihydrotalcite, and alkali metal salts and alkaline earth metal salts of higher fatty acids, including but not limited to, calcium stearate, zinc stearate, magnesium behenate, magnesium stearate, sodium ricinoleate, potassium palmitate, antimony pyrocatecholate, zinc pyrocatecholate, and mixtures thereof.

Non-limiting examples of nucleating agents useful in the present subject matter include inorganic substances including, but not limited to, talcum, metal oxides, including but not limited to, titanium dioxide and magnesium oxide, phosphates, carbonates and sulfates of alkaline earth metals, organic compounds, including but not limited to mono- or polycarboxylic acids and the salts thereof, including but not limited to, 4☐-tert-butylbenzoic acid, adipic acid, diphenylacetic acid, sodium succinate, sodium benzoate, polymeric compounds including, but not limited to, ionic copolymers (ionomers), and mixtures thereof. Non-limiting examples of clarifiers useful in the present subject matter include substituted and unsubstituted bisbenzylidene sorbitols.

Non-limiting examples of conventional fillers useful in the present subject matter include reinforcing agents, including but not limited to, calcium carbonate, silicates, glass fibers, glass bulbs, asbestos, talc, kaolin, mica, barium sulfate, metal oxides and hydroxides not provided elsewhere in this disclosure, carbon black, graphite, wood flour, flours and fibers of other natural products, synthetic fibers, and mixtures thereof.

Non-limiting examples of dispersing agents useful in the present subject matter include polyethylene oxide waxes, mineral oil, and mixtures thereof.

Non-limiting examples of other additives useful in the present subject matter include plasticizers, lubricants, emulsifiers, pigments, rheology additives, catalysts, flow-control agents, optical brighteners, flame-proofing agents, antistatic agents, blowing agents, and mixtures thereof.

Articles of Manufacture

The irradiated polymer compositions of the present subject matter can be used to produce a variety of articles of manufacture conventionally known in the art, including but not limited to foamed articles, blow-molded articles, injection-molded articles, extruded articles, sheets, films, and combinations thereof.

Additionally, articles produced from the irradiated polymer compositions of the present subject matter can be produced by manufacturing processes well known to those skilled in the art.

EXAMPLES

The following examples are illustrative of preferred compositions and are not intended to be limitations thereon. All polymer molecular weights are mean average molecular weights. All percentages are based on the percent by weight of the final composition prepared, and unless otherwise indicated, all totals equal 100% by weight.

Test Methods

All melt flow rates throughout this disclosure, including $MFR_i$ and $MFR_f$, were measured by ASTM D1238.

Melt tensions throughout this disclosure were measured on a Goettfert Rheotens apparatus at 200° C. The Rheoten apparatus consists of two counter-rotating wheels mounted on a balance beam. A melt strand of an irradiated polymer composition of the present subject matter is extruded from a capillary die and pulled between the counter-rotating wheels until the strand ruptures. The pulling velocity of the counter-rotating wheels is initially constant to establish a baseline of force, with a constant acceleration then applied to the strand until the strand ruptures. The maximum force measured before rupture during the test is taken as the melt tension. The extensibility of the melt tension is represented by the velocity at rupture. Yellowing (YI) throughout this disclosure was measured according to ASTM 1295-77. Foam density throughout this disclosure was measured according to ASTM D972.

Chimassorb® 944 (Chim 944), Ciba Specialty Chemicals Corp., poly[[6-[(1,1,3,3-tetramethylbutyl)amino]s-striazine-2,4-diyl][[(2,2,6,6-tetramethyl-4-piperidyl}imino]hexaethylene[2,2,6,6-tetramethyl-4-piperidyl}imino]].

Genox™ EP, GE Chemicals, a di($C_{16}$ □$C_{18}$)alkyl methyl amine oxide.

Irganox® 1010 (Irg. 1010), Ciba Specialty Chemicals Corp., pentaerythritol tetrakis[3-(3,5-di-tert-butyl-4-hydroxyphenol)propionate.

Irganox® 1076 (Irg. 1076), Ciba Specialty Chemicals Corp., octodecyl 3-(3,5-di-tert-butyl-4-hydroxyphenyl)propionate.

Irgafos® 168 (Irg. 168), Ciba Specialty Chemicals Corp., tris(2,4-di-tert-butylphenyl)phosphate.

Irgastab® FS-042 (FS-042), Ciba Specialty Chemicals Corp., N,N-di(alkyl)hydroxylamine produced by a direct oxidation of N,N-di(hydrogenated tallow)amine.

Polymer A is a polypropylene homopolymer comprising a MFR of 0.25 dg/min, an isotacticity index of 95.6, and is commercially available from Basell Polyolefins.

Polymer B is a polypropylene homopolymer comprising a MFR of 0.15 dg/min, an isotacticity index of 95.7, and is commercially available from Basell Polyolefins.

Polymer C is a polypropylene random copolymer comprising a MFR of 2 dg/min, an isotacticity index of 6.4, and is commercially available from Basell Polyolefins.

Polymer D is a polypropylene homopolymer comprising a MFR of 0.4 dg/min, an isotactity index of 95.4, and is commercially available from Basell Polyolefins.

Polymer E is a propylene homopolymer comprising a MFR of 12 dg/min, an isotacticity index of 95.0, and is commercially available from Basell Polyolefins.

Preparation of Exemplary Intermediate Polyolefin Resins (Samples 4-28)

Exemplary intermediate polyolefin resins (samples 4-28 in Table 1) were prepared by dry blending a polyolefin resin consisting of at least one polymer A-E with at least one non-phenolic stabilizer, along with 0.03 pph of calcium stearate. After blending, the exemplary intermediate polyolefin resins were then extruded in pellet form on a 1¼ in Killion extruder at 210° C. at a screw speed of 100 r.p.m. The MFR and YI of the pelletized exemplary intermediate polyolefin resins were then measured by the aforementioned test methods.

Preparation of Comparative Intermediate Polyolefin Resins (Samples 1-3, and 29-31)

Comparative intermediate polyolefin resins (samples 1-3, and 29-31 in Table 1) were prepared by either using at least one polymer A-E without any phenolic or non-phenolic stabilizers, or by dry blending a polyolefin resin consisting of at least one polymer A-E with at least one phenolic stabilizer. All comparative intermediate polyolefin resin samples, along with the exemplary intermediate polyolefin resin samples, were prepared with 0.03 pph of calcium stearate. After blending, the comparative intermediate polyolefin resins were then extruded in pellet form on a 1¼ in Killion extruder at 210° C. at a screw speed of 100 r.p.m. The MFR and YI of the pelletized comparative intermediate polyolefin resins were then measured by the aforementioned test methods.

Preparation of Exemplary Intermediate Irradiated Polyolefin Resins in a Reduced Oxygen Environment (Samples 4-23, 26, and 28)

The pelletized exemplary intermediate polyolefin resins (samples 4-23, 26, and 28 in Table 1) were then individually placed in glass a reaction tube, with the glass reaction tube subsequently being purged with nitrogen for at least 15 minutes to ensure each pelletized intermediate polyolefin resin was in a reduced oxygen environment for the irradiation treatment. After purging, the glass reaction tube was closed and packed in ice. Unless specified otherwise, each pelletized intermediate polyolefin resin was subjected to an irradiation treatment, the irradiation treatment comprising exposing each pelletized exemplary intermediate polyolefin resin to a dosage of electron beam irradiation at the indicated dosage or dosages to give the indicated total radiation exposure. After the irradiation treatment, the intermediate irradiated polyolefin resins were heat treated by placing the glass reaction tube in an oil bath set at the temperature indicated in Table 1 for 105 minutes, and then the samples were quenched at the temperature indicated in Table 1.

For gamma irradiation, the intermediate polyolefin resins were irradiated at ambient temperature.

Preparation of Comparative Intermediate Irradiated Polyolefin Resins in Air (Samples 24-25, and 27) and in a Reduced Oxygen Environment (Samples 1-3, and 29-31)

The comparative intermediate irradiated polyolefin resins were prepared by either irradiating an exemplary intermediate polyolefin resin in air by traditional irradiation treatment processes (samples 24-25, and 27 in Table 1), or by irradiating a comparative intermediate polyolefin resin in a reduced oxygen environment (samples 1-3, and 29-31 in Table 1).

Accordingly, to prepare the comparative intermediate irradiated polyolefin resins by irradiating an exemplary intermediate polyolefin resin in air, the exemplary intermediate polyolefin resin were placed in an aluminum container and irradiated in ambient air at the indicated dosage or dosages to give the indicated total radiation exposure. After the irradiation treatment in ambient air, the comparative intermediate irradiated polyolefin resins were then subsequently heat treated by placing the glass reaction tube in an oil bath set at the temperature indicated in Table 1 for 105 minutes, and then quenched at the temperature indicated in Table 1.

With respect to the comparative intermediate irradiated polyolefin resin prepared by irradiating a comparative intermediate polyolefin resin in a reduced oxygen environment, the comparative intermediate polyolefin resins sample were individually placed in glass a reaction tube, with the glass reaction tube subsequently being purged with nitrogen for at least 15 minutes to ensure each comparative pelletized intermediate polyolefin resin was in a reduced oxygen environment for the irradiation treatment. After purging, the glass reaction tube was closed and packed in ice. Unless specified otherwise, each comparative pelletized intermediate polyolefin resin was subjected to an irradiation treatment, the irradiation treatment comprising exposing each comparative pelletized intermediate polyolefin resin to a dosage of electron beam irradiation at the indicated dosage or dosages to give the indicated total radiation exposure. After the irradiation treatment, the comparative intermediate irradiated polyolefin resins were treated by placing the glass reaction tube in an oil bath set at 80° C. for 105 minutes, and then quenched by placing the glass reaction tube in an oven set at 140° C. for 90 minutes.

For gamma irradiation, the comparative intermediate polyolefin resins were irradiated at ambient temperature.

Additionally, for gamma irradiation, the samples were irradiated at ambient temperature.

Irradiation Treatment

Irradiation treatments were carried out in a single dose or multiple doses, as indicated in Table 1.

Irradiation Treatments in a Reduced Oxygen Environment

The exemplary reduced oxygen environment used for either irradiating the exemplary intermediate polyolefin resins to produce the exemplary intermediate irradiated polyolefin resins, or for irradiating the comparative intermediate polyolefin resins to produce the comparative intermediate irradiated polyolefin resins, was essentially free of all active oxygen, and was filled with nitrogen, unless specified otherwise.

Irradiation Treatments in a Traditional Irradiation Environment (in Air)

The exemplary traditional irradiation environment in air used for the comparative intermediate polyolefin resins comprised an aluminum container in ambient air.

Treatment of Exemplary Intermediate Irradiated Polyolefin Resins

After irradiating the exemplary embodiments of the intermediate irradiated polyolefin resins of the present subject matter, and maintaining the exemplary embodiments in the reduced oxygen environment, at least one treatment process comprising one or two steps was performed on each sample. The treatment steps comprised at least one heat treatment, quenching treatment, or combination thereof as outlined in Table 1.

Treatment of Comparative Intermediate Irradiated Polyolefin Resins

After irradiating the comparative embodiments of intermediate irradiated polyolefin resins, at least one treatment process comprising one or two steps was performed on each sample. The treatment steps comprised at least one heat treatment, quenching treatment, or combination thereof as outlined in Table 1.

TABLE 1

Preparation of exemplary irradiated polymer compositions of the present subject matter (samples 4-23, 26, and 28) and comparative irradiated polymer compositions (samples 1-3, 24-25, 27, and 29-31).

| Sample Designation | Before Radiation $MFR_i$ (dg/min) | After Radiation $MFR_f$ (dg/min) | Melt tension (cN) | YI | Stabilizers* | $O_2$ | Doses (Megarad) | Heat (° C.) | Quench (° C.) |
|---|---|---|---|---|---|---|---|---|---|
| 1 (Polymer A) | 0.8 | 5.9 | 19 | 4.5 | No stabilizer | Inert | 9 | 80 | 140 |
| 2 (Polymer A) | 0.36 | 18 | 4.8 | 20 | Irg. 1076 (0.05 pph)/ Irg. 168 (0.05 pph) | Inert | 9 | 80 | 140 |
| 3 (Polymer A) | 0.31 | 15 | 6.9 | 17 | Irg. 1010 (0.05 pph)/ Irg. 168 (0.05 ph) | Inert | 9 | 80 | 140 |
| 4 (Polymer A) | 0.37 | 3.6 | 24 | 0.6 | Chim 944 (0.05 ph)/ FS-042 (0.05 pph) | Inert | 9 | 80 | 140 |
| 5 (Polymer A) | 0.32 | 4.3 | 23 | 1.7 | Chim 944/(0.05 pph) Genox EP (0.05 pph) | Inert | 9 | 80 | 140 |
| 6 (Polymer A) | 0.33 | 0.25 | 58 | 2.5 | Chim 944 (0.05 ph)/ FS-042 (0.05 pph) | Inert | 9 (4.5 Megarad × 2) | 65 | 140 |
| 7 (Polymer A) | 0.33 | 2.1 | 53 | 2.2 | Chim 944 (0.05 ph)/ FS-042 (0.05 pph) | Inert | 12 (6 Megarad × 2) | 65 | 140 |
| 8 (Polymer A) | 0.33 | 0.14 | 60 | 2.4 | Chim 944 (0.05 ph)/ FS-042 (0.05 pph) | Inert | 12 (6 Megarad × 2) | 80 | 140 |
| 9 (Polymer B) | 0.2 | 0.19 | 56 | 2.6 | Chim 944 (0.05 ph)/ FS-042 (0.05 pph) | Inert | 9 (4.5 Megarad × 2) | 65 | 140 |

TABLE 1-continued

Preparation of exemplary irradiated polymer compositions of the present subject matter (samples 4-23, 26, and 28) and comparative irradiated polymer compositions (samples 1-3, 24-25, 27, and 29-31).

| Sample Designation | Before Radiation MFR$_i$ (dg/min) | After Radiation MFR$_f$ (dg/min) | Melt tension (cN) | YI | Stabilizers* | $O_2$ | Doses (Megarad) | Heat (° C.) | Quench (° C.) |
|---|---|---|---|---|---|---|---|---|---|
| 10 (Polymer B) | 0.2 | 0.1 | 47 | 2.5 | Chim 944 (0.05 ph)/ FS-042 (0.05 pph) | Inert | 12 (6 Megarad × 2) | 65 | 140 |
| 11 (Polymer B) | 0.23 | 0.23 | 62 | 5.7 | Genox EP (0.05 pph) | Inert | 9 (4.5 Megarad × 2) | 65 | 140 |
| 12 (Polymer B) | 0.25 | 0.22 | 52 | 4.6 | FS-042 (0.05 phh) | Inert | 9 (4.5 Megarad × 2) | 65 | 140 |
| 13 (Polymer B) | 0.2 | 0.2 | 55 | 2.9 | Chim 944 (0.05 ph)/ FS-042 (0.05 pph) | Inert | 12 (6 Megarad × 2) | 80 | 140 |
| 14 (Polymer B) | 0.2 | 1.7 | 29 | 1.5 | Chim 944 (0.05 ph)/ FS-042 (0.05 pph) | Inert | 9 | 80 | 140 |
| 15 (Polymer C) | 2.3 | 2.6 | 21 | −0.95 | Chim 944 (0.05 ph)/ FS-042 (0.05 pph) | Inert | 6 | 65 | 140 |
| 16 (Polymer D) | 0.66 | 0.7 | 58 | −0.1 | Chim 944 (0.05 ph)/ FS-042 (0.05 pph) | Inert | 9 (4.5 Megarad × 2) | 65 | 140 |
| 17 (Polymer E) | 13 | 37 | 0.6 | 0.8 | Chim 944 (0.05 ph)/ FS-042 (0.05 pph) | Inert | 3 | 80 | 140 |
| 18 (Polymer E) | 13 | 62 | 0.3 | −0.27 | Chim 944 (0.05 ph)/ FS-042 (0.05 pph) | Inert | 6 | 80 | 140 |
| 19 (Polymer D) | 0.66 | 4.9 | 19 | −0.85 | Chim 944 (0.05 ph)/ FS-042 (0.05 pph) | Inert | 9 | 80 | 140 |
| 20 (Polymer A) | 0.34 | 2.8 | 27 | 1.5 | Chim 944 (0.1 ph)/FS-042 (0.1 pph) | Inert | 9 | 80 | 140 |
| 21 (Polymer A) | 1.1 | 3.9 | 24 | 0.83 | Chim 944 (0.1 ph) | Inert | 9 | 80 | 140 |
| 22 (Polymer A) | 0.34 | 2.5 | 24 | 1.8 | FS-042 (0.1 pph) | Inert | 9 | 80 | 140 |
| 23 (Polymer A) | 0.33 | 1.8 | 25 | 1.4 | Chim 944 (0.05 ph)/ FS-042 (0.05 pph) | Inert | 9 | 25 | 140 |
| 24 (Polymer A) | 0.33 | 34 | 8 | 3.7 | Chim 944 (0.05 ph)/ FS-042 (0.05 pph) | Air | 9 | 25/air | 25/air |
| 25 (Polymer A) | 0.33 | 28 | 9 | 5.8 | Chim 944 (0.05 ph)/ FS-042 (0.05 pph) | Air | 9 | 25/air | 140 |
| 26 (Polymer A) | 0.33 | 1.3 | 39 | — | Chim 944 (0.05 ph)/ FS-042 (0.05 pph) | Inert | 9 (4.5 Megarad × 2) | 65 | — |
| 27 (Polymer A) | 0.33 | 6.9 | 30 | — | Chim 944 (0.05 ph)/ FS-042 (0.05 pph) | Air | 9 (3 Megarad × 3 Megarad Gamma) | 25/air | 140/air |
| 28 (Polymer A) | 0.33 | 0.05 | 55 | — | Chim 944 (0.05 ph)/ FS-042 (0.05 pph) | Inert | 9 (3 Megarad × 3 Megarad Gamma) | 25/inert | 140/inert |
| 29 (Polymer A) | 0.68 | 1.8 | 31 | 8.4 | Irg. 1010 (0.05 pph) | Inert | 9 (4.5 Megarad × 2) | 65 | 140 |
| 30 (Polymer A) | 0.56 | 2.6 | 24 | 8.3 | Irg 168 (0.05 pph) | Inert | 9 (4.5 Megarad × 2) | 65 | 140 |
| 31 (Polymer A) | 0.31 | 6.8 | 12 | 29 | Irg 1010 (0.05 pph)/ Irg 168 (0.05 pph) | Inert | 9 (4.5 Megarad × 2) | 65 | 140 |

*all samples contained 0.03 pph of calcium stearate.

Preparation of Exemplary Foamed Irradiated Polymer Compositions

Exemplary foamed irradiated polymer compositions (samples 32-37 in Table 2) were prepared by dry blending polymer A with 0.05 pph of FS042, 0.05 pph of Chimassorb 944, 1.3 pph of polymer E, and 0.03 pph of calcium stearate. The blend was then extruded on a ZSK-92 extruder at 210-230 C. The extruded pellets were then irradiated in an irradiation chamber by passing the pellets through an electron beam (4 MeV, 50 mA beam current Van de Graff generator) via a conveyor belt. The speed of the conveyor belt was adjusted to provide a total radiation dosage as indicated in Table 2. Additionally, the active oxygen content of the reduced oxygen environment within the irradiation chamber, and the rest of the experiment was established and maintained at less than 0.004% by volume. The irradiated pellets were then conveyed to a fluid bed reactor with different temperature zones for thermal and quench treatments as indicated in Table 2. Z1, Z2 and Z4 in Table 2 represent different temperature zones within the fluid bed reactor. After irradiation, a foam rod was prepared from each sample. The foam rods were prepared on two tandem, single-screw extruders with isobutane being used as a blowing agent. The first extruder was a 2.5 □single-screw extruder, with the extruder temperature set at 230-235° C. The second extruder was a 3.5 single-screw extruder, with the extruder temperature set at 177-182° C. Additionally, after irradiation, foam sheet were prepared from samples 32, 35, and 36 in Table 2. The foam sheets were made on a 1.5 □single-screw extruder, with the extruder temperature set at 175-200° C. using Safoam FPE-20 as a blowing agent available from Reedy International.

TABLE 2

Preparation of exemplary foamed irradiated polymer compositions of the present subject matter (samples 32-37).

| Sample Designation | Dosage (Megarad) | Z1 Temp/Time (° C./min) | Z2 Temp/Time (° C./min) | Z4 Temp/Time (° C./min) | MFR Before Irradiation, $MFR_i$ (dg/min) | MFR After Irradiation, $MFR_f$ (dg/min) | Melt tension (cN) | Foam rod density (pcf) | Foam sheet density (pcf) |
|---|---|---|---|---|---|---|---|---|---|
| 32 (Polymer A) | 9 | 60/27 | 75/90 | 140/90 | 0.44 | 1.33 | 22 | 2.25 | 34.3 |
| 33 (Polymer A) | 12 | 62/27 | 73/90 | 140/90 | 0.44 | 1.93 | 21 | 2.1 | — |
| 34 (Polymer A) | 9 | 68/18 | 80/90 | 140/90 | 0.44 | 1.28 | 24 | 2.27 | — |
| 35 (Polymer A) | 12 | 68/18 | 80/90 | 140/90 | 0.44 | 2.27 | 20 | 2.3 | 32.5 |
| 36 (Polymer A) | 15 | 80/18 | 80/90 | 140/90 | 0.44 | 4.41 | 24 | 2.38 | 31.1 |
| 37 (Polymer A) | 9 | 80/18 | 80/90 | 140/90 | 0.44 | 2.06 | 22 | 2.1 | — |

All incorporations by reference throughout this disclosure are done within the spirit and scope of the disclosure herein, and are not meant to limit the disclosure or scope of the following claims.

Additionally, the present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. An irradiated polymer composition comprising:
   (A) at least one polyolefin resin, wherein the polyolefin resin is selected from the group consisting of:
      (a) a crystalline propylene homopolymer comprising an isotactic index greater than 80%;
      (b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;
      (c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;
   (d) an olefin polymer composition comprising:
      (i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
      (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
      (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
      wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;
   (e) a thermoplastic olefin comprising:
      (i) about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;

(ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and (iii) about 3% to about 40% by weight of a copolymer of ethylene and propylene or a copolymer of ethylene and an α-olefin, wherein the copolymer is insoluble in xylene at ambient temperature;

(f) an ethylene homopolymer;

(g) a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;

(h) a random terpolymer of ethylene and two $C_{3-10}$ α-olefins, wherein the random terpolymer comprises a maximum polymerized α-olefin content of about 20% by weight;

(i) a butene-homopolylner;

(j) a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and (k) mixtures and combinations thereof; and (B) least one non-phenolic stabilizer, wherein the irradiated polymer composition is produced by a process comprising mixing the polyolefin resin with the non-phenolic stabilizer to form an intermediate polyolefin resin;

irradiating the intermediate polyolefin resin with about 1 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;

maintaining the intermediate irradiated polyolefin resin in the reduced oxygen environment for a period of time sufficient for a significant amount of long chain branches to form within the intermediate irradiated polyolefin resin; and treating the intermediate irradiated polyolefin resin while the intermediate irradiated polyolefin resin is in the reduced oxygen environment to substantially deactivate all free radicals present in the intermediate irradiated polyolefin resin.

2. The irradiated polymer composition of claim 1, wherein the electron beam radiation is about 2 Megarad to about 15 Megarad.

3. The irradiated polymer composition of claim 1, wherein the active oxygen is in an established and maintained concentration of less than about 5% by volume, with respect to a total volume of the reduced oxygen environment.

4. The irradiated polymer composition of claim 1, wherein the non-phenolic stabilizer comprises at least one:
(a) hindered amine;
(b) compound selected from the group consisting of
i.) a hydroxylamine;
ii.) a nitrone;
iii.) an amine oxide;
iv.) benzofuranone; and
v.) mixtures thereof;
(c) organic phosphite;
(d) phosphonite; and
(e) mixtures thereof.

5. The irradiated polymer composition of claim 1, wherein the non-phenolic stabilizer comprises at least one hindered amine, wherein the hindered amine comprises at least one group of formula (I):

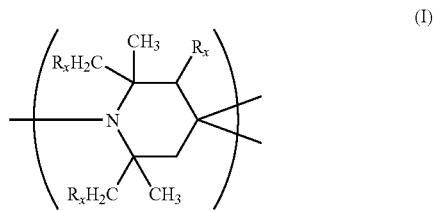

wherein $R_x$ are each, independently of each other; hydrogen, a $C_1$-$C_{10}$ alkyl, a $C_2$-$C_{10}$ alkenyl, a $C_3$-$C_{10}$ aryl, and an arylalkyl comprising from 1 to 10 carbon atoms in the alkyl part and from 3 to 10 carbon atoms in the aryl part.

6. The irradiated polymer composition of claim 1, wherein the non-phenolic stabilizer comprises at least one hindered amine, wherein the hindered amine is selected from the group consisting of:

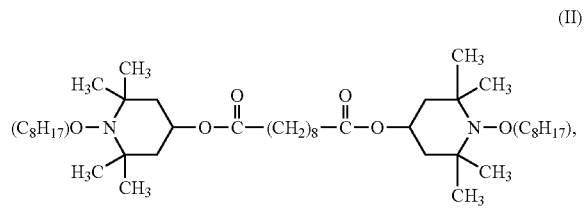

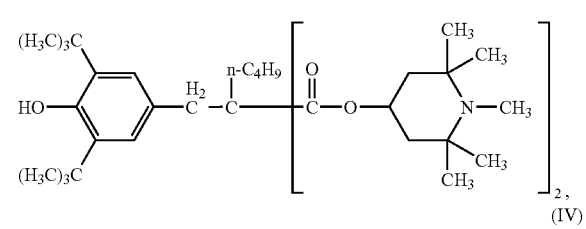

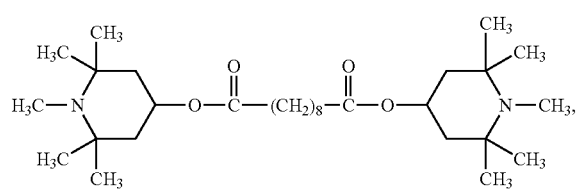

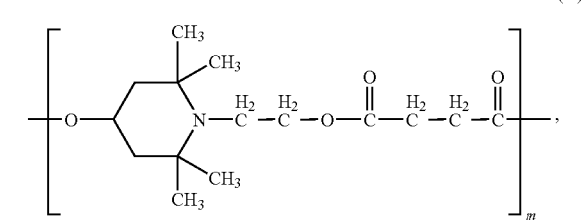

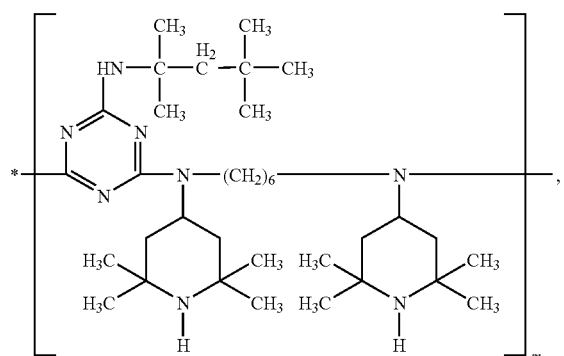
(VI)
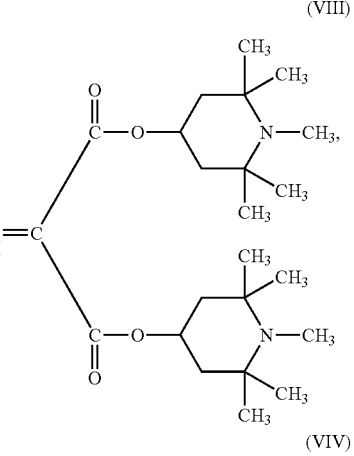
(VIII)
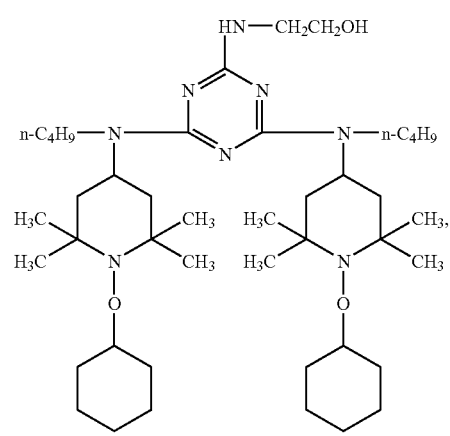
(VII)
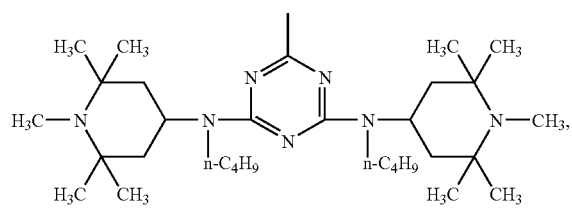
(VIV)
$$R'-\overset{H}{N}-(CH_2)_3-\overset{R'}{N}-(CH_2)_2-\overset{R'}{N}-(CH_2)_3-\overset{H}{N}-R',$$ (X)
wherein R' is of formula (X(i))
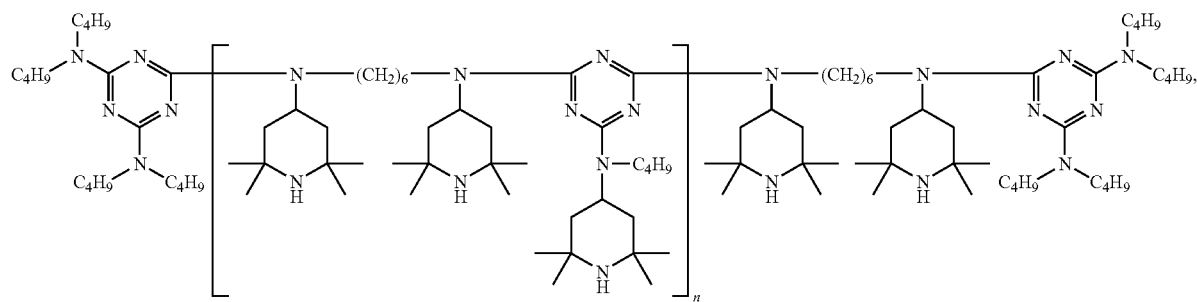
(X(i))
(XI)

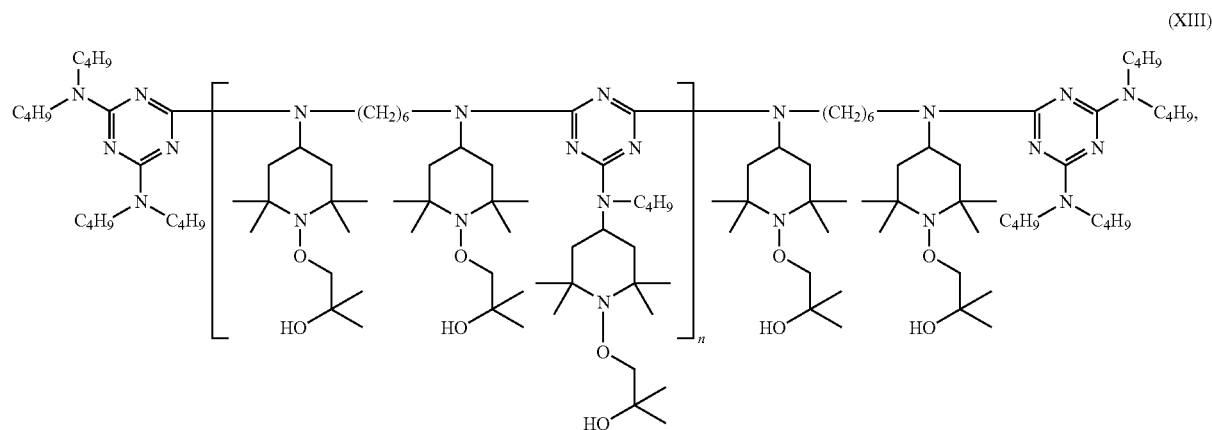
(XIII)
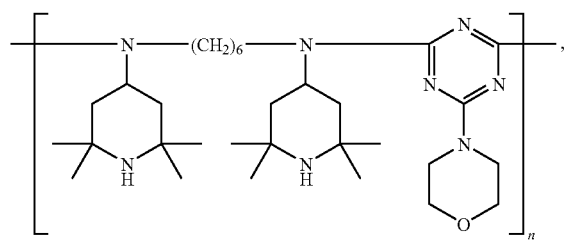
(XIV)
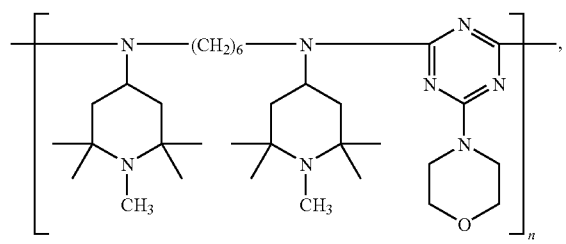
(XV)
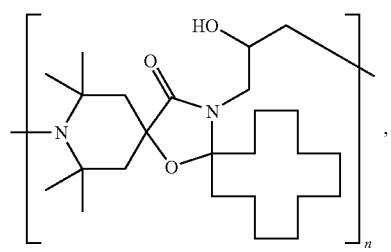
(XVI)
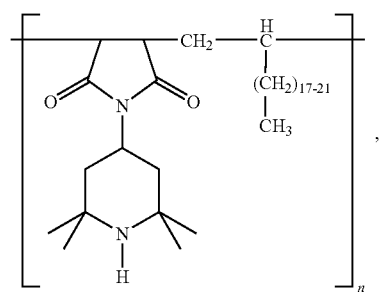
(XVII)
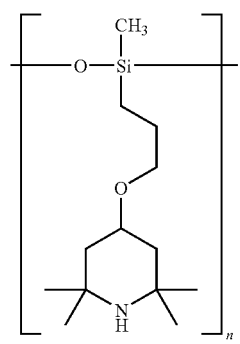
(XVIII)
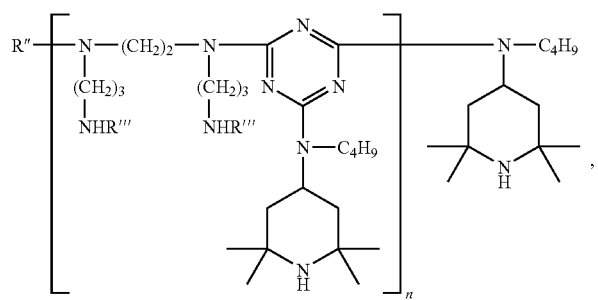
(XVIV)

wherein
R'' is hydrogen or R'''; and
R''' is of formula (XVIV(i))

(XVIV(i))

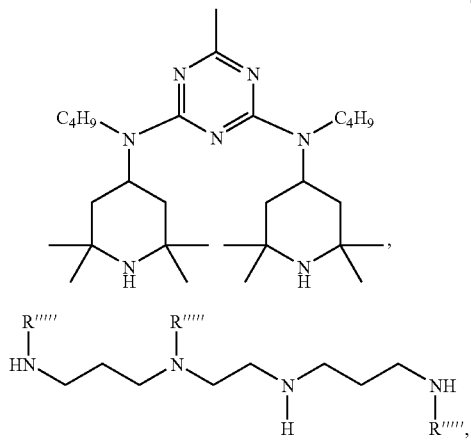

R'''' is of formula (XX(i))

(XX)

(XX(i))

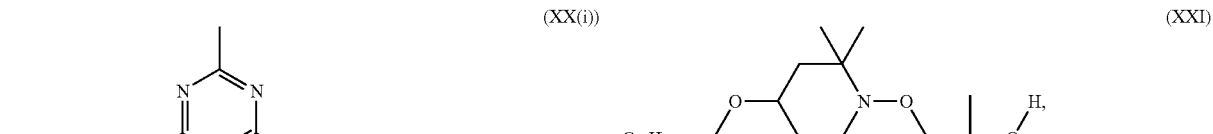

and combinations thereof.

7. The irradiated polymer composition of claim 1, wherein the non-phenolic stabilizer comprises at least one hydroxylamine, wherein the hydroxylamine is of formula (XXIII)

(XXIII)

wherein
$T^1$ is a $C_1$-$C_{36}$ straight or branched chain alkyl, a $C_5$-$C_{12}$ cycloalkyl, or a $C_7$-$C_9$ aralkyl, the aralkyl optionally being substituted by at least one $C_1$-$C_{12}$ alkyl or by at least one halogen atom; and $T^2$ is hydrogen or a $C_1$-$C_{36}$ straight or branched chain alkyl, a $C_5$-$C_{12}$ cycloalkyl, or a $C_7$-$C_9$ aralkyl, the aralkyl optionally being substituted by at least one $C_1$-$C_{12}$ alkyl or by at least one halogen atom.

8. The irradiated polymer composition of claim 1, wherein the non-phenolic stabilizer comprises at least one amine oxide, wherein the amine oxide is of formula (XXIV)

(XXI)

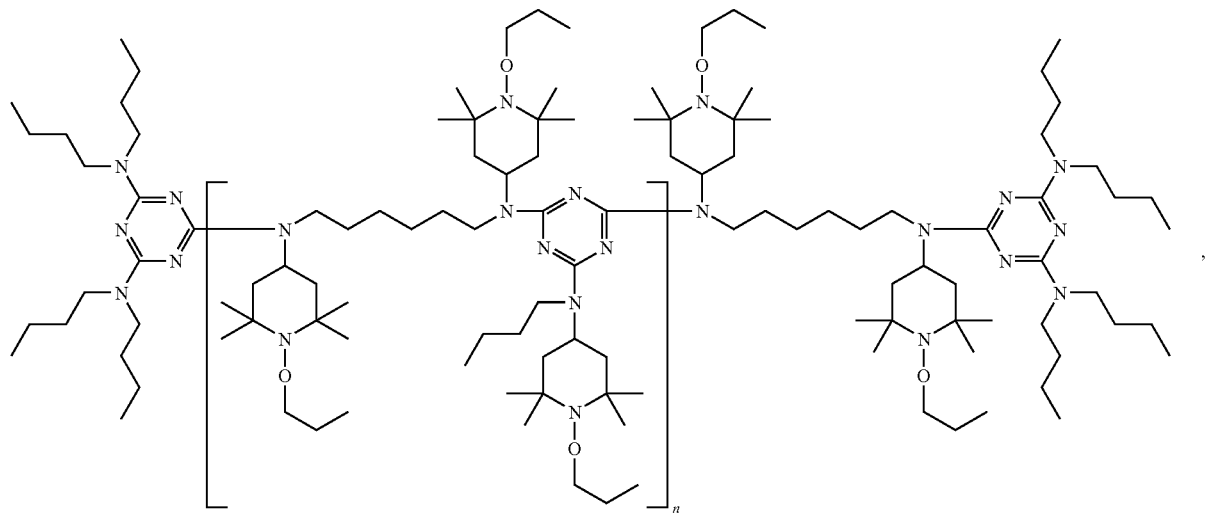

(XXII)

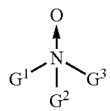 (XXIV)

wherein
G¹ and G² are each independently of each other, a C₆-C₃₆ straight or branched alkyl, a C₆-C₁₂ aryl, a C₇-C₃₆ aralkyl, a C₇-C₃₆ alkaryl, a C₅-C₃₆ cycloalkyl, a C₆-C₃₆ alkcycloalkyl, or a C₆-C₃₆ cycloalkylalkyl;

G³ is a C₁-C₃₆ straight or branched chain alkyl, a C₆-C₁₂ aryl, a C₇-C₃₆ aralkyl, a C₇-C₃₆ alkaryl, a C₅-C₃₆ cycloalkyl, a C₆-C₃₆ alkcycloalkyl, or a C₆-C₃₆ cycloalkylalkyl, with the proviso that at least one of G¹, G² and G³ comprise a β carbon-hydrogen bond, and the alkyl, aralkyl, alkaryl, cycloalkyl, alkcycloalkyl and cycloalkylalkyl groups optionally comprise at least one heteroatom containing group, the heteroatom containing group being selected from the group consisting of —O—, —S—, —SO—, —SO₂—, —COO—, —OCO—, —CO—, —NG⁴-, —CONG⁴-, —NG⁴CO—, and combinations thereof, and the alkyl, aralkyl, alkaryl, cycloalkyl, alkcycloalkyl and cycloalkylalkyl groups are optionally substituted by at least one group selected from —OG⁴, —SG⁴, —COOG⁴, —OCOG⁴, —COG⁴, —N(G⁴)₂, —CON(G⁴)₂, —NG⁴COG⁴ and 5- and 6-membered rings comprising —C(CH₃)(CH₂R)NL'(CH₂R_z)(CH₃)C—; wherein G⁴ is independently of each other, hydrogen or a C₁-C₈ alkyl;
R_z is hydrogen methyl;
L' is a C₁-C₃₀ straight or branched chain alkyl, —C(O)R"", or —OR""; and
R"" is a C₁-C₃₀ straight or branched chain alkyl.

9. The irradiated polymer composition of claim 1, wherein the non-phenolic stabilizer comprises at least one organic phosphite, phosphonite, or mixtures thereof, wherein the organic phosphite and phosphonine comprise at least one formula selected from (XXVI), (XXVII), (XXVIM, (XX-VIV), (XXX), (XXXI), and (XXXII):

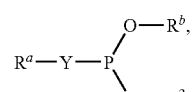 (XXVI)

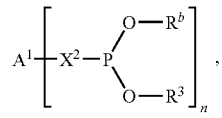 (XXVII)

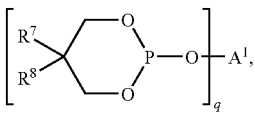 (XXVIII)

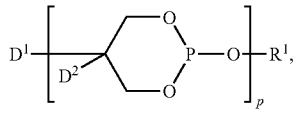 (XXVIV)

 (XXX)

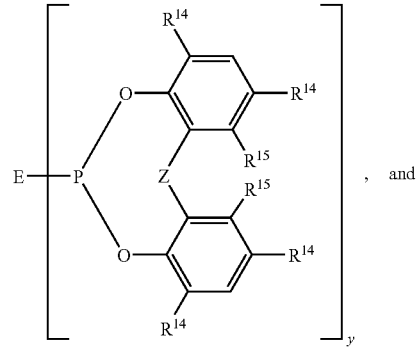 (XXXI)

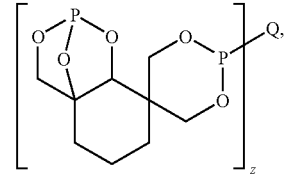 (XXXII)

wherein
n is 2, 3 or 4;
p is 1 or 2;
q is 2 or 3;
r is 4 to 12;
y is 1, 2 or 3; and
z is 1 to 6;
A¹, if n and/or q is 2, is a C₂-C₁₈ alkylene, a C₂-C₁₂ alkylene comprising at least one oxygen, sulfur, —NR₄—, or combinations thereof, phenylene, or a radical comprising formula (XXXIII) or (XXXIV):

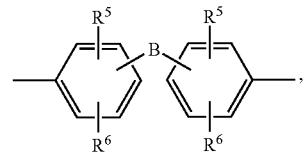 (XXXIII)

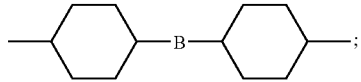 (XXXIV)

A¹, if n and/or q is 3, is a radical —C_rH_{2r-1}—;
A¹, if n is 4, is

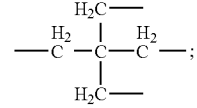 (XXXV)

A² is a C₂-C₁₈ alkylene, a C₂-C₁₂ alkylene comprising at least one oxygen, sulfur, —NR₄—, or combinations thereof phenylene, or a radical comprising formula (XXXIII) or (XXXIV):

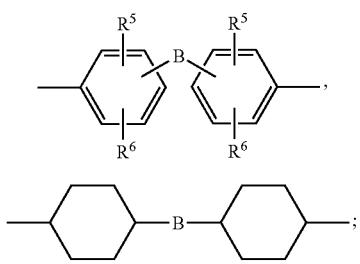

(XXXIII)

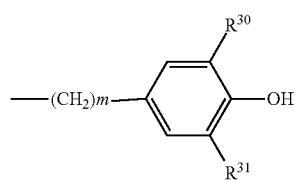

(XXXIV)

B is a direct bond, —$CH_2$—, —$CHR^4$—, —$CR^1R^4$—, sulfur, a $C_5$-$C_7$ cycloalkylidene, or a $C_5$-$C_7$ cyclohexylidene, wherein the $C_5$-$C_7$ cycloalkylidene and the $C_5$-$C_7$ cyclohexylidene is optionally substituted in at least one 3, 4 and 5 position with at least one $C_1$-$C_4$ alkyl radical;

$D^1$, if p is 1, is a $C_1$-$C_4$ alkyl;
$D^1$, if p is 2, is —$CH_2OCH_2$—;
$D^2$, if p is 1, is a $C_1$-$C_4$ alkyl;
$D^2$, if p is 2, is a $C_1$-$C_4$ alkyl or —$CH_2OCH_2$—;
E, if y is 1, is a $C_1$-$C_{18}$ alkyl, —$OR_1$, or halogen;
E, if y is 2, is —O-$A^2$-O—;
E, if y is 3, is a $R^4C(CH_2O—)_3$, or $N(CH_2CH_2O—)_3$;
Q is a radical of a z-valent alcohol or phenol, wherein Q is attached to the phosphorus atom in formula (XXXII) via an oxygen in the z-valent alcohol or phenol;
$R^a$, $R^b$, and $R^3$ are each, independently of each other, a $C_1$-$C_{18}$ alkyl optionally comprising at least one oxygen, sulfur, or —$NR^4$— and optionally substituted by at least one halogen; —$COOR^4$; —CN; —$CONR^4R^4$; a $C_7$-$C_9$ phenylalkyl; a $C_4$-$C_{12}$ cycloalkyl; a phenyl optionally substituted with at least one halogen, a $C_1$-$C_3$ alkyl, or a $C_1$-$C_{18}$ alkoxy; a naphthyl optionally substituted with at least one halogen, a $C_1$-$C_3$ alkyl, or a $C_1$-$C_{18}$ alkoxy; a $C_7$-$C_9$ phenylalkyl; or a radical of formula (XXXVI):

(XXXVI)

—$(CH_2)m$—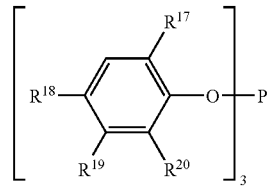—OH wherein
m is an integer ranging from 3 to 6;
$R^4$ is hydrogen, a $C_1$-$C_{18}$ alkyl, a $C_5$-$C_{12}$ cycloalkyl, or a $C_7$-$C_9$ phenylalkyl;
$R^{30}$ and $R^{31}$ are each, independently of each other, hydrogen, a $C_1$-$C_8$ alkyl, or a $C_5$-$C_6$ cycloalkyl;
$R^7$ and $R^8$, if q is 2, are each, independently of each other, a $C_1$-$C_4$ alkyl, or together form a 2,3-dehydropentamethylene radical;
$R^7$ and $R^8$, if q is 3, are methyl;
$R^{14}$ are each, independently of each other, hydrogen, a $C_1$-$C_9$ alkyl, or cyclohexyl;
$R^{15}$ are each, independently of each other, hydrogen or methyl;
$X^2$ and Y are each, independently of each other, a direct bond or oxygen;
Z is a direct bond, methylene, —$C(R^{16})_2$—, or sulfur; and
$R^{16}$ are each, independently of each other, a $C_1$-$C_8$ alkyl.

10. The irradiated polymer composition of claim 1, wherein the non-phenolic stabilizer comprises at least one organic phosphite, phosphonite, or mixtures thereof, wherein at least one of the organic phosphite and phosphonite comprise formula (XXXVII):

(XXXVII)

$$\left[ \begin{array}{c} R^{17} \\ R^{18} \phantom{xxx} \\ R^{19} \phantom{x} R^{20} \end{array} O \right]_3 P$$

wherein
$R^{17}$ and $R^{18}$ are each, independently of each other, hydrogen, a $C_1$-$C_8$ alkyl, a cyclohexyl, or phenyl; and
$R^{19}$ and $R^{20}$ are each, independently of each other, hydrogen or a $C_1$-$C_4$ alkyl.

11. A process for producing an irradiated polymer composition, wherein the irradiated polymer composition comprises:

(A) at least one polyolefin resin, wherein the polyolefin resin is selected from the group consisting of:
(a) a crystalline propylene homopolymer comprising an isotactic index greater than 80%;
(b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4C_{10}$ α-olefin, the crystalline random copolymer comprises a maximum polymerized α-olefin content of about 20% by weight;
(c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum, polymerized ethylene content of about 5% by weight;
(d) an olefin polymer composition comprising:
(i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
(ii) about 3 parts to about 25 parts by weight of a copolymer of ethylene and propylene, or ethylene and a $C_4$-$C_{10}$ α-olefin, wherein the copolymer is insoluble in xylene at ambient temperature; and
(iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a dime, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

(e) a thermoplastic olefin comprising:
  (i) about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature;

(f) an ethylene homopolymer;
(g) a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;
(h) a random terpolymer of ethylene and two $C_{3-10}$ α-olefins, wherein the random terpolymer comprises a maximum polymerized α-olefin content of about 20% by weight;
(i) a butene-1 homopolymer;
(j) a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and
(k) mixtures and combinations thereof; and
(B) at least one non-phenolic stabilizer, the process comprising:
mixing the polyolefin resin with the non-phenolic stabilizer to form an intermediate polyolefin resin;
irradiating the intermediate polyolefin resin with about 1 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;

maintaining the intermediate irradiated polyolefin resin in the reduced oxygen environment for a period of time sufficient for a significant amount of long chain branches to form within the intermediate irradiated polyolefin resin; and treating the intermediate irradiated polyolefin resin while the intermediate irradiated polyolefin resin is in the reduced oxygen environment to substantially deactivate all free radicals present in the intermediate irradiated polyolefin resin.

12. The process of claim 11, wherein the electron beam radiation ranges from about 2 Megarad to about 15 Megarad.

13. The process of claim 11, wherein the active oxygen is in an established and maintained concentration of less than about 5% by volume, with respect to a total volume of the reduced oxygen environment.

14. A foamed article comprising an irradiated polymer composition, wherein the irradiated polymer composition comprises:

(A) at least one polyolefin resin, wherein the polyolefin resin is selected from the group consisting of:
  (a) a crystalline propylene homopolymer comprising an isotactic index greater than 80%;
  (b) a crystalline random copolymer comprising propylene and an olefin selected from the group consisting of ethylene and a $C_4$-$C_{10}$ α-olefin, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight;
  (c) a crystalline random terpolymer comprising propylene and two olefins selected from the group consisting of ethylene, and $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight;
  (d) an olefin polymer composition comprising:
    (i) about 10 parts to about 60 parts by weight of a crystalline propylene homopolymer comprising an isotactic index of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and an isotactic index greater than about 60%;
    (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
    (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;

wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages;

(e) a thermoplastic olefin comprising:
   (i) about 10% to about 60% by weight of a propylene homopolymer comprising an isotactic index at least 80%, or a crystalline copolymer selected from the group consisting of (a) ethylene and propylene, (b) ethylene, propylene and a $C_4$-$C_8$ α-olefin, and (c) ethylene and a $C_4$-$C_{10}$ α-olefin, the crystalline copolymer comprising a propylene content greater than 85% by weight and an isotactic index of greater than 60%;
   (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
   (iii) about 3% to about 40% by weight of a copolymer of ethylene and propylene or a copolymer of ethylene and an α-olefin, wherein the copolymer is insoluble in xylene at ambient temperature;

(f) an ethylene homopolymer;

(g) a random copolymer of ethylene and an α-olefin, the α-olefin being selected from the group consisting of $C_{3-10}$ α-olefins, wherein the random copolymer of ethylene comprises a maximum polymerized α-olefin content of about 20% by weight;

(h) a random terpolymer of ethylene and two $C_{3-10}$ α-olefins, wherein the random terpolymer comprises a maximum polymerized α-olefin content of about 20% by weight;

(i) a butene-1 homopolymer;

(j) a copolymer, terpolymer, or combination thereof, of butene-1, wherein the copolymer of butene-1 and the terpolymer of butene-1 comprise at least one α-olefin, with the proviso that the α-olefin is not butene, and the copolymer of butene and the terpolymer of butene comprise an α-olefin comonomer content of from 1 to 15 mole %; and (k) mixtures and combinations thereof; and (B) least one non-phenolic stabilizer,
wherein the irradiated polymer composition is produced by a process comprising
   mixing the polyolefin resin with the non-phenolic stabilizer to form an intermediate polyolefin resin;
   irradiating the intermediate polyolefin resin with about 1 to about 20 Megarad of electron beam radiation to form an intermediate irradiated polyolefin resin; the intermediate polyolefin resin being irradiated in a reduced oxygen environment, wherein active oxygen is in an established and maintained concentration of less than about 15% by volume, with respect to a total volume of the reduced oxygen environment;
   maintaining the intermediate irradiated polyolefin resin in the reduced oxygen environment for a period of time sufficient for a significant amount of long chain branches to form within the intermediate irradiated polyolefin resin; and
   treating the intermediate irradiated polyolefin resin while the intermediate irradiated polyolefin resin is in the reduced oxygen environment to substantially deactivate all free radicals present in the intermediate irradiated polyolefin resin.

15. The irradiated polymer composition of claim 1, wherein the irradiated polymer composition comprises from about 0.005% to about 10% by weight of the non-phenolic stabilizer.

16. The process of claim 11, wherein the irradiated polymer composition comprises from about 0.005% to about 10% by weight of the non-phenolic stabilizer.

17. The irradiated polymer composition of claim 1, wherein the intermediate polyolefin resin is in pellet form before being irradiated.

18. The process of claim 11, wherein the intermediate polyolefin resin is in pellet form before being irradiated.

19. The foamed article of claim 14, wherein the intermediate polyolefin resin is in pellet form before being irradiated.

20. The process of claim 11, wherein the intermediate polyolefin resin is irradiated multiple times.

* * * * *